US007120697B2

(12) United States Patent
Aiken, Jr. et al.

(10) Patent No.: US 7,120,697 B2
(45) Date of Patent: Oct. 10, 2006

(54) METHODS, SYSTEMS AND COMPUTER PROGRAM PRODUCTS FOR PORT ASSIGNMENTS OF MULTIPLE APPLICATION INSTANCES USING THE SAME SOURCE IP ADDRESS

(75) Inventors: John Andrew Aiken, Jr., Raleigh, NC (US); Wesley McMillan Devine, Apex, NC (US); David Anthony Herr, Apex, NC (US); Mark W. McClintock, Raleigh, NC (US); Raymond E. Ward, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 836 days.

(21) Appl. No.: 09/862,968

(22) Filed: May 22, 2001

(65) Prior Publication Data
US 2002/0178268 A1    Nov. 28, 2002

(51) Int. Cl.
*G06F 13/00* (2006.01)
(52) U.S. Cl. ............... 709/229; 709/226; 709/228; 709/249
(58) Field of Classification Search ............... 709/219, 709/225, 226, 227, 228, 229, 238, 249, 250
See application file for complete search history.

(56) References Cited

U.S. PATENT DOCUMENTS

| 4,403,286 | A | 9/1983 | Fry et al. ............... 364/200 |
|---|---|---|---|
| 4,495,570 | A | 1/1985 | Kitajima et al. ......... 364/200 |
| 4,577,272 | A | 3/1986 | Ballew et al. ........... 364/200 |
| 5,031,089 | A | 7/1991 | Liu et al. ............... 364/200 |
| 5,341,477 | A | 8/1994 | Pitkin et al. |
| 5,537,542 | A | 7/1996 | Eilert et al. ........... 395/184.01 |
| 5,563,878 | A | 10/1996 | Blakeley et al. ......... 370/60 |
| 5,603,029 | A | 2/1997 | Aman et al. ............. 395/675 |
| 5,675,739 | A | 10/1997 | Eilert et al. ............ 395/200 |
| 5,740,371 | A | 4/1998 | Wallis ................. 395/200.59 |
| 5,754,752 | A | 5/1998 | Sheh et al. ........... 395/182.02 |
| 5,774,660 | A | 6/1998 | Brendel et al. ........ 395/200.31 |
| 5,774,668 | A | 6/1998 | Choquier et al. ...... 395/200.53 |
| 5,796,936 | A | 8/1998 | Watabe et al. ........ 395/182.09 |
| 5,812,771 | A | 9/1998 | Fee et al. ............ 395/200.31 |
| 5,828,847 | A | 10/1998 | Gehr et al. ........... 395/200.69 |
| 5,867,636 | A | 2/1999 | Walker ................. 395/114 |
| 5,867,661 | A | * | 2/1999 | Bittinger et al. ............ 709/227 |
| 5,917,997 | A | 6/1999 | Bell et al. ........... 395/182.02 |
| 5,918,017 | A | 6/1999 | Attanasio et al. ...... 395/200.54 |
| 5,923,854 | A | 7/1999 | Bell et al. ............ 395/200.73 |

(Continued)

FOREIGN PATENT DOCUMENTS

EP        0648038 A2    8/1994

OTHER PUBLICATIONS

U.S. Appl. No. 09/693,663, filed Oct. 20, 2000.

(Continued)

*Primary Examiner*—Viet Vu
(74) *Attorney, Agent, or Firm*—Myers Bigel Sibley & Sajovec

(57) ABSTRACT

Methods, systems and computer program products provide assignment of ports for connections originated by multiple application instances executing on different data processing systems utilizing a common network address. An indication of available ports for the common network address is provided to each of the different data processing systems executing the multiple application instances. A port identified as available is selected as a port for a connection utilizing the common network address.

32 Claims, 13 Drawing Sheets

U.S. PATENT DOCUMENTS

| | | | | |
|---|---|---|---|---|
| 5,935,215 | A | 8/1999 | Bell et al. | 709/239 |
| 5,941,988 | A | 8/1999 | Bhagwat et al. | 713/201 |
| 5,946,686 | A | 8/1999 | Schmuck et al. | 707/10 |
| 5,951,650 | A | 9/1999 | Bell et al. | 709/238 |
| 5,951,694 | A | 9/1999 | Choquier et al. | 714/15 |
| 6,031,978 | A | 2/2000 | Cotner et al. | 395/200.78 |
| 6,104,717 | A * | 8/2000 | Coile et al. | 370/401 |
| 6,119,174 | A | 9/2000 | Borowsky et al. | 710/15 |
| 6,128,279 | A | 10/2000 | O'Neil et al. | 370/229 |
| 6,141,759 | A | 10/2000 | Braddy | 713/201 |
| 6,223,205 | B1 | 4/2001 | Harchol-Balter et al. | 709/105 |
| 6,247,057 | B1 * | 6/2001 | Barrera, III | 709/229 |
| 6,252,878 | B1 | 6/2001 | Locklear, Jr. et al. | 370/401 |
| 6,286,039 | B1 | 9/2001 | Van Horne et al. | 709/221 |
| 6,314,463 | B1 | 11/2001 | Abbott et al. | 709/224 |
| 6,317,786 | B1 | 11/2001 | Yamane et al. | 709/224 |
| 6,324,177 | B1 * | 11/2001 | Howes et al. | 370/389 |
| 6,330,560 | B1 | 12/2001 | Harrison et al. | 707/8 |
| 6,363,081 | B1 * | 3/2002 | Gase | 370/466 |
| 6,374,300 | B1 | 4/2002 | Masters | 709/202 |
| 6,430,622 | B1 | 8/2002 | Aiken, Jr. et al. | 709/245 |
| 6,445,704 | B1 * | 9/2002 | Howes et al. | 370/392 |
| 6,446,225 | B1 | 9/2002 | Robsman et al. | 714/55 |
| 6,542,926 | B1 | 4/2003 | Zalewski et al. | 709/213 |
| 6,578,066 | B1 | 6/2003 | Logan et al. | 709/105 |
| 6,587,866 | B1 | 7/2003 | Modi et al. | 709/105 |
| 6,591,262 | B1 | 7/2003 | Maclellan et al. | 707/2 |
| 6,594,268 | B1 | 7/2003 | Aukia et al. | 370/400 |
| 6,606,315 | B1 | 8/2003 | Albert et al. | 370/352 |
| 6,650,641 | B1 | 11/2003 | Albert et al. | 370/392 |
| 6,657,974 | B1 | 12/2003 | Britton et al. | 370/216 |
| 6,701,377 | B1 | 3/2004 | Burmann et al. | 709/249 |
| 6,704,317 | B1 | 3/2004 | Dobson | 370/401 |
| 6,718,383 | B1 | 4/2004 | Hebert | 709/224 |
| 2002/0010783 | A1 | 1/2002 | Primak et al. | 709/228 |
| 2002/0091831 | A1 | 7/2002 | Johnson | 709/227 |
| 2002/0124089 | A1 | 9/2002 | Aiken, Jr. et al. | 709/227 |
| 2002/0143953 | A1 | 10/2002 | Aiken, Jr. et al. | 709/227 |
| 2002/0143954 | A1 | 10/2002 | Aiken, Jr. et al. | 709/227 |
| 2002/0166080 | A1 | 11/2002 | Attanasio et al. | 714/15 |
| 2002/0178265 | A1 | 11/2002 | Aiken, Jr. et al. | 709/228 |
| 2002/0199000 | A1 | 12/2002 | Banerjee | 709/227 |
| 2003/0061402 | A1 | 3/2003 | Yadav | 709/328 |
| 2003/0079146 | A1 | 4/2003 | Burstein | 713/201 |
| 2003/0202536 | A1 | 10/2003 | Foster et al. | 370/469 |

OTHER PUBLICATIONS

U.S. Appl. No. 09/693,027, filed Oct. 20, 2000.
A. Dahlin, et al. *EDDIE A Robust and Scalable Internet Server*. Ericsson Telecom AB, Stockholm, Sweden, pp. 1-7 (May 1998).
Brochure entitled, *ACEdirector™ 8-PORT 10/100 MBPS Ethernet Switch*. Alteon WebSystems, San Jose, CA (1999).
Brochure entitled, *Enhancing Web User Experience with Global Server Load Balancing*. Alteon WebSystems, San Jose, CA (Jun. 1999).
Brochure entitled, *The Next Step in Server Load Balancing*. Alteon WebSystems, San Jose, CA (Nov. 1999).
Mac Devine. Presentation entitled, *TCP/IP Application Availability and Workload Balancing in the Parallel Sysplex*. Share Technical Conference (Aug. 22-27, 1999).
http://w3.enterlib.ibm.com:80/cgi-bin/bookmgr/books/F1AF7001/1.3.1.2; *1.3.1.2.5 Virtual IP Addressing (VIPA)*; Excerpt from IP Configuration for OS/390, pp. 1-4 (1998).
http://w3.enterlib.ibm.com:80/cgi-bin/bookmgr/books/F1AF7001/1.3.2; *1.3.20 DEVICE and LINK Statement—Virtual Devices (VIPA)*; Excerpt from IP Configuration for OS/390, pp. 1-3 (1998).
http://w3.enterlib.ibm.com:80/cgi-bin/bookmgr/books/F1AF7001/1.3.2; *1.3.23. HOME Statement*; Excerpt from IP Configuration for OS/390, pp. 1-6 (1998).
Pai et al. *Locality-Aware Request Distribution in Cluster-based Network Servers*. Proceedings of the 8th International Conference on Architectural Support for Programming Languages and Operating Systems (ASPLOS VIII), San Jose, CA, Oct. 1998.
Aron et al. "Scalable Content-aware Request Distribution in Cluster-based Network Servers." Proc. of the 2000 Annual Usenix Technical Conference, San Diego, CA, Jun. 2000.
Aron et al. "Efficient Support for P-HTTP in Cluster-Based Web Servers." Proc. of 1999 Annual Usenix Technical Conference, Monterey, CA, Jun. 1999.
Aron, Mohit. "Scalable Content-aware Request Distribution in Cluster-based Network Servers." http://softlib.rice.edu/softlib/scalableRD.html. Department of Computer Science, Rice University.
"Data Communications Awards Allot Communications 'Hot Product' in Internetworking/IP Tools Category." Press Bulletin. Los Gatos, CA, Jan. 18, 1999.
"Allot Introduces Turnkey Next Generation IP Service and Creation Solution—the Virtual Bandwidth Manager." Press Bulletin. Atlanta, GA, SUPERCOMM 2000, Booth #8458, Jun. 5, 2000.
"Allot Announces the General Availability of its Directory Services-Based NetPolicy™ Manager." Press Bulletin. Tel Aviv, Israel, Feb. 28, 2000.
"Allot Communications Announces the Netenforcer Family of IP Traffic Management Products: Fault-Tolerant, Scaleable, Policy-Based Bandwidth Management, QOS, SLA Solutions." Press Bulletin. Burlingame, CA, Dec. 13, 1999.
"Allot Communications Announces Business-Aware Network Policy Manager." Press Bulletin. Sophia Antipolis, France, Sep. 20, 1999.
"Allot Communications Announces Directory Services Based Network Policy Manager." Press Bulletin. Los Gatos, CA, Apr. 5, 1999.
"Allot Communications Launches NetEnforcer with NetWizard, the Fastest Way to Implement Accurate and Reliable Network QoS Policies." Press Bulletin. Burlingame, CA, Jan. 25, 2001.
"Policy-Based Network Architecture." from www.allot.com pp. 1-11.
U.S. Appl. No. 09/401,419, entitled, *Methods, Systems and Computer Program Products for Automated Movement of IP Addresses Within a Cluster*, filed Sep. 22, 1999.
U.S. Appl. No. 09/640,412, entitled, *Methods, Systems and Computer Program Products for Non-Disruptively Transferring a Virtual Internet Protocol Address Between Communication Protocol Stacks*, filed Aug. 17, 2000.
U.S. Appl. No. 09/640,409, entitled, *Methods, Systems and Computer Program Products for Cluster Workload Distribution*, filed Aug. 17, 2000.
U.S. Appl. No. 09/640,438, entitled, *Methods, Systems and Computer Program Products for Failure Recovery of Virtual Internet Protocol Addresses*, filed Aug. 17, 2000.

\* cited by examiner

METHODS, SYSTEMS AND COMPUTER PROGRAM PRODUCTS FOR PORT ASSIGNMENTS OF MULTIPLE APPLICATION INSTANCES USING THE SAME SOURCE IP ADDRESS

RELATED APPLICATIONS

The present application is related to commonly assigned and concurrently filed U.S. patent application Ser. No. 09/862,642, entitled "METHODS, SYSTEMS AND COMPUTER PROGRAM PRODUCTS FOR SOURCE ADDRESS SELECTION", the disclosure of which is incorporated herein by reference as if set forth fully herein.

FIELD OF THE INVENTION

The present invention relates to network communications and more particularly to network communications to a cluster of data processing systems.

BACKGROUND OF THE INVENTION

The Internet Protocol (IP) is a connectionless protocol. IP packets are routed from an originator through a network of routers to the destination. All physical adapter devices in such a network, including those for client and server hosts, are identified by an IP Address which is unique within the network. One valuable feature of IP is that a failure of an intermediate router node or adapter need not prevent a packet from moving from source to destination, as long as there is an alternate path through the network.

In Transmission Control Protocol/Internet Protocol (TCP/IP), TCP sets up a connection between two endpoints, identified by the respective IP addresses and a port number on each. Unlike failures of an adapter in an intermediate node, if one of the endpoint adapters (or the link leading to it) fails, all connections through that adapter generally fail and must be reestablished. If the failure is on a client workstation host, only the relatively few client connections are typically disrupted and usually only one person is inconvenienced. However, an adapter failure on a server may mean that hundreds or thousands of connections may be disrupted. On a System/390 with large capacity, the number may run to tens of thousands.

To alleviate this situation, International Business Machines Corporation introduced the concept of a Virtual IP Address, or VIPA, on its TCP/IP for OS/390 V2R5 (and added to V2R4 as well). Examples of VIPAs and their use may be found in U.S. Pat. Nos. 5,917,997, 5,923,854, 5,935,215 and 5,951,650. A VIPA is typically configured the same as a normal IP address for a physical adapter, except that it is not associated with any particular device. To an attached router, the TCP/IP stack on System/390 simply looks like another router. When the TCP/IP stack receives a packet destined for one of its VIPAs, the inbound IP function of the TCP/IP stack notes that the IP address of the packet is in the TCP/IP stack's Home list of IP addresses and forwards the packet up the TCP/IP stack. The "home list" of a TCP/IP stack is the list of IP addresses which are "owned" by the TCP/IP stack. Assuming the TCP/IP stack has multiple adapters or paths to it (including a Cross Coupling Facility (XCF) path from other TCP/IP stacks in a Sysplex), if a particular physical adapter fails, the attached routing network will route VIPA-targeted packets to the TCP/IP stack via an alternate route. The VIPA may, thus, be thought of as an address to the stack, and not to any particular adapter.

U.S. patent application Ser. No. 09/401,419 entitled "METHODS, SYSTEMS AND COMPUTER PROGRAM PRODUCTS FOR AUTOMATED MOVEMENT OF IP ADDRESSES WITHIN A CLUSTER" filed Sep. 22, 1999, the disclosure of which is incorporated herein by reference as if set forth fully herein, describes dynamic virtual IP addresses (VIPA) and their use. As described in the '419 application, a dynamic VIPA may be automatically moved from protocol stack to protocol stack in a predefined manner to overcome failures of a particular protocol stack (i.e. VIPA takeover). Such a predefined movement may provide a predefined backup protocol stack for a particular VIPA. VIPA takeover was made available by International Business Machines Corporation (IBM), Armonk, N.Y., in System/390 V2R8 which had a general availability date of September, 1999.

As described above, the Virtual IP Address (VIPA) on TCP/IP for MVS and OS/390 allows clients to establish TCP connections and send UDP datagrams to a server using an IP address that is owned by a TCP/IP stack, and reachable via any interface, but not tied to any particular adapter. This allows such connections or UDP datagram transmissions to be unaffected by a failure of one adapter owned by the TCP/IP stack, as long as at least one other device for external connectivity to the same network remains operational.

A TCP program on OS/390 may also initiate an outbound connection, acting as a client rather than a server for the purposes of that particular connection. Such a TCP program will typically not bind the socket to any particular local address before initiating the connection and normal TCP rules will use the address of the adapter on which the connection request is transmitted. As a result, the connection may be lost if that same adapter or link should fail while the connection is still active.

To provide the benefits of VIPA to outbound connections, the SOURCEVIPA function was provided to allow the customer to configure a VIPA to be associated with a group of adapters/links, and to cause TCP/IP to use the VIPA instead of the adapter address when a hosted TCP program initiates a connection without binding the socket to a particular IP address.

The above approach works well for a TCP program that is hosted by only one TCP/IP stack for all time and/or when the program receiving the connection request does not care what IP address is used for the source address of the connection request. There are a number of cases, however, where the traditional SOURCEVIPA approach does not meet the needs of particular applications.

For example, some application pairs require both members to function as both client and server, in that one partner establishes a connection to the other, which in turn establishes a connection back to the first. Such applications will often use the source and destination IP addresses to correlate the paired connections. Dynamic VIPAs (DVIPAs) were invented by IBM to address the problem of outages suffered by a TCP/IP stack or an underlying OS/390 image or S/390 processing complex. A DVIPA is a VIPA which can move from one TCP/IP stack to another, under program control, managed either by collaborating stacks or which can be made active on a TCP/IP stack in response to programming actions by an application. Since DVIPAs by their very nature may move from stack to stack, they typically cannot be used for SOURCEVIPA, which must, in general, be predictable to be useful by the customer. When one of the application pair resides on OS/390 and uses a DVIPA for incoming connections, SOURCEVIPA will not result in using the same DVIPA for the return connection. The application can be programmed specifically to bind the socket for the outbound connection to the DVIPA, but this may make the resulting application less portable, and may require per-application reprogramming.

In a further example, some servers may need to establish connections to other servers in order to process a request from the original client. These secondary connections may cross enterprises, and may, thus, traverse multiple firewalls. When such servers are used in conjunction with Sysplex Distributor or other IP workload balancing solutions, a server instance on one TCP/IP stack could use a different SOURCEVIPA than a server instance on another stack. All intervening firewalls may, therefore, need to be configured to be aware of, and permit passage of, connection requests from any possible VIPA that might be used as a SOURCEVIPA. The benefit of Sysplex Distributor is that clients outside the Sysplex generally reach all such server instances using the same IP address. Thus, customers would, typically, prefer the server instances going to secondary servers to use the same Distributed DVIPA to reduce configuration of intervening firewalls to a single IP address, independent of where the server instances reside (or might be moved) within the Sysplex.

Furthermore, multiple server instances in a Sysplex Distributor environment may need to establish connections to exactly the same secondary server. A TCP connection is generally identified by source and destination IP address, and source and destination port numbers (the combination of which is known as the "connection 4-tuple"). In this case, the destination IP address and port are the same for all such connections. Programs initiating outbound connections seldom specify source IP address, and almost never specify the port. Instead, they rely on the TCP/IP stack to select a port which is at present not in use by another TCP application. Such a port assignment is known as an "ephemeral port." When a source IP address could reside on only one TCP/IP stack, it did not matter that two different stacks might assign the same ephemeral port number, because the source IP addresses for connections to the same secondary server would be different. Now that Sysplex Distributor allows the same IP address to reside on multiple TCP/IP stacks, and for that same IP address to be used for connections to the rest of the network, it is possibile that two stacks could generate the same connection 4-tuple for connections from different Sysplex Distributor server instances to the same secondary server.

One advantage of OS/390 lies in serving multiple different workloads within the same operating system image and cluster (S/390 Parallel Sysplex). Sysplex Distributor allows a single IP address (the Distributed DVIPA) to be associated with all instances of a particular server application administratively with the Domain Name Server. However, the same TCP/IP stack may be a target stack for multiple Distributed DVIPAs, and many applications that use DVIPAs that are not distributed. In the absence of application programming, there is typically no way for the TCP/IP stack or the system administrator to designate which of many possible DVIPAs should be used for a particular application. Sysplex Distributor as well as dynamic VIPAs are described in U.S. patent application Ser. No. 09/640,412, entitled, "METHODS, SYSTEMS AND COMPUTER PROGRAM PRODUCTS FOR NON-DISRUPTIVELY TRANSFERRING A VIRTUAL INTERNET PROTOCOL ADDRESS BETWEEN COMMUNICATION PROTOCOL STACKS", U.S. patent application Ser. No. 09/640,409, entitled "METHODS, SYSTEMS AND COMPUTER PROGRAM PRODUCTS FOR CLUSTER WORKLOAD DISTRIBUTION", U.S. patent application Ser. No. 09/640,438, entitled "METHODS, SYSTEMS AND COMPUTER PROGRAM PRODUCTS FOR FAILURE RECOVERY FOR ROUTED VIRTUAL INTERNET PROTOCOL ADDRESSES" all filed Aug. 17, 2000, and U.S. patent application Ser. No. 09/401,419 entitled "METHODS, SYSTEMS AND COMPUTER PROGRAM PRODUCTS FOR AUTOMATED MOVEMENT OF IP ADDRESSES WITHIN A CLUSTER" filed Sep. 22, 1999, the disclosures of which are each incorporated herein by reference as if set forth fully herein. VIPAs were provided in OS/390 V2R5 which had a general availability date of March, 1998, Sysplex Distributor was provided in OS/390 V2R10 which had a general availability date of September, 2000 and dynamic VIPAs were provided in OS/390 V2R8 which had a general availability date of September, 1999, both from International Business Machines Corporation, Armonk, N.Y.

SUMMARY OF THE INVENTION

Methods, systems and computer program products according to embodiments of the present invention provide assignment of ports for connections originated by multiple application instances executing on different data processing systems utilizing a common network address. An indication of available ports for the common network address is provided to each of the different data processing systems executing the multiple application instances. A port identified as available is selected as a port for a connection utilizing the common network address as a source address.

In particular embodiments of the present invention, the indication of available ports is provided by maintaining an identification of available ports associated with the common network address in a storage accessible by each of the data processing systems. In such embodiments, selecting a port may be accomplished by selecting a port identified as available in the storage accessible by each of the data processing systems. Furthermore, selection of a port identified as available may be responsive to one of the multiple applications requesting to establish a connection utilizing the common network address as a source address for the connection. In particular embodiments of the present invention, the common network address is a virtual Internet Protocol address. The identification of available ports may be provided by an identification of ports associated with existing connections utilizing the common network address such that ports which are not identified as associated with existing connections are available.

In further embodiments of the present invention, a connection is established utilizing the selected port and the common network address as a source network address and port of the connection. The selected port may also be identified as unavailable in the storage accessible by each of the data processing systems. The connection utilizing the selected port and the common network address may also be terminated. In such a case, the selected port may be identified as available in the storage accessible by each of the data processing systems.

In additional embodiments of the present invention, the different data processing systems are in a SYSPLEX and the storage accessible by each of the data processing systems is a coupling facility. Furthermore, maintaining an identification of available ports associated with the common network address in a storage accessible by each of the data processing systems and selecting a port may be provided by selecting a port identified as available in the storage accessible by each of the data processing systems. Such operations may be carried out by communication protocol stacks of the data processing systems.

Methods, systems and computer program products according to embodiments of the present invention may also provide for coordinating port assignments for connections utilizing a dynamic virtual Internet Protocol address (DVIPA) as a source address. The DVIPA is utilized as a source address for connections originated by a plurality of data processing systems. Such coordination is provided by maintaining an indication of available ports associated with the DVIPA in a storage facility which is commonly accessible to communication protocol stacks of the plurality of data processing systems. A port for a connection utilizing the DVIPA is selected as a source address based on the indication of available ports associated with the DVIPA in the storage facility. Furthermore, maintaining an indication of available ports and selecting a port may be carried out by the communication protocol stacks of the plurality of data processing systems.

In further embodiments of the present invention, maintaining an indication of available ports associated with the DVIPA is provided by maintaining a structure in a coupling facility of a SYSPLEX, the structure indicating whether a port is in use by a connection utilizing the DVIPA as a source address. In such embodiments, selecting a port includes accessing the coupling facility to obtain the structure and evaluating the structure to select a port which is not in use by a connection. The structure in the coupling facility may also be updated to reflect that the selected port is in use by a connection utilizing the DVIPA as a source address.

Accessing the coupling facility and updating the coupling facility may be provided by obtaining the structure from the coupling facility and locking the structure in the coupling facility to prevent access to the structure by other communication protocol stacks. The structure is revised to reflect that the selected port is in use and the structure is returned to the coupling facility. The returned structure is unlocked in the coupling facility to allow access to the structure by other communication protocol stacks.

In particular embodiments of the present invention, the structure is a bitmap. In such embodiments, revising the structure includes setting a bit of the bitmap to a predefined value to indicate that a port corresponding to the bit is in use.

In still further embodiments of the present invention, maintaining an indication of available ports and selecting a port are selectively carried out by the communication protocol stacks responsive to a predefined keyword being provided in a configuration statement which defines the DVIPA to the communication protocol stack. The configuration statement may be a VIPADEFine statement, a VIPA-DISTribute statement and/or a VIPARANGE statement. Furthermore, the indication of available ports may be updated to reflect existing connections using the DVIPA if the predefined keyword is added to a configuration statement after initialization of a routing communication protocol stack, for example, by a VARY OBEY.

In additional embodiments of the present invention, maintaining a structure in a coupling facility includes updating the structure in the coupling facility to reflect that a port of a connection utilizing the DVIPA as a source address is not in use when the connection utilizing the DVIPA as a source address terminates. Updating the structure in the coupling facility may include obtaining the structure from the coupling facility, locking the structure in the coupling facility to prevent access to the structure by other communication protocol stacks, revising the structure to reflect that the port associated with the terminated connection is not in use, returning the structure to the coupling facility, and unlocking the structure in the coupling facility to allow access to the structure by other communication protocol stacks. If the structure is a bitmap, revising the structure may be provided by setting a bit of the bitmap to a predefined value to indicate that a port corresponding to the bit is not in use.

In still further embodiments of the present invention, maintaining an indication of available ports associated with the DVIPA is provided by maintaining a copy of a connection routing hash table associated with the DVIPA in a coupling facility of a SYSPLEX. The connection routing hash table indicates source address and port and destination address and port for connections utilizing the DVIPA. In such embodiments, selecting a port may be provided by determining a connection routing hash table entry for source address and port and destination address and port of a connection utilizing the DVIPA as a source address, evaluating the connection routing hash table in the coupling facility to determine if an entry exists corresponding to the determined connection routing hash table entry, and selecting the port utilized in determining the connection routing hash table entry if a corresponding entry does not exist.

The connection routing hash table may also be updated in the coupling facility to incorporate the determined connection routing hash table entry. Evaluating the connection routing hash table and updating the connection routing hash table may include obtaining the connection routing hash table from the coupling facility, locking the structure in the coupling facility to prevent access to the connection routing hash table by other communication protocol stacks, incorporating the determined connection routing hash table entry into the connection routing hash table, returning the connection routing hash table to the coupling facility, and unlocking the connection routing hash table in the coupling facility to allow access to the connection routing hash table by other communication protocol stacks.

The connection routing hash table may also be updated in the coupling facility to reflect that a connection utilizing the DVIPA as a source address is not in use when the connection utilizing the DVIPA as a source address terminates. In such embodiments, updating the connection routing hash table in the coupling facility may be provided by obtaining the connection routing hash table from the coupling facility, locking the connection routing hash table in the coupling facility to prevent access to the connection routing hash table by other communication protocol stacks, revising the connection routing hash table to remove an entry corresponding to the terminated connection, returning the connection routing hash table to the coupling facility, and unlocking the connection routing hash table in the coupling facility to allow access to the connection routing hash table by other communication protocol stacks.

As will further be appreciated by those of skill in the art, the present invention may be embodied as methods, apparatus/systems and/or computer program products.

DETAILED DESCRIPTION OF THE INVENTION

Figure 1:
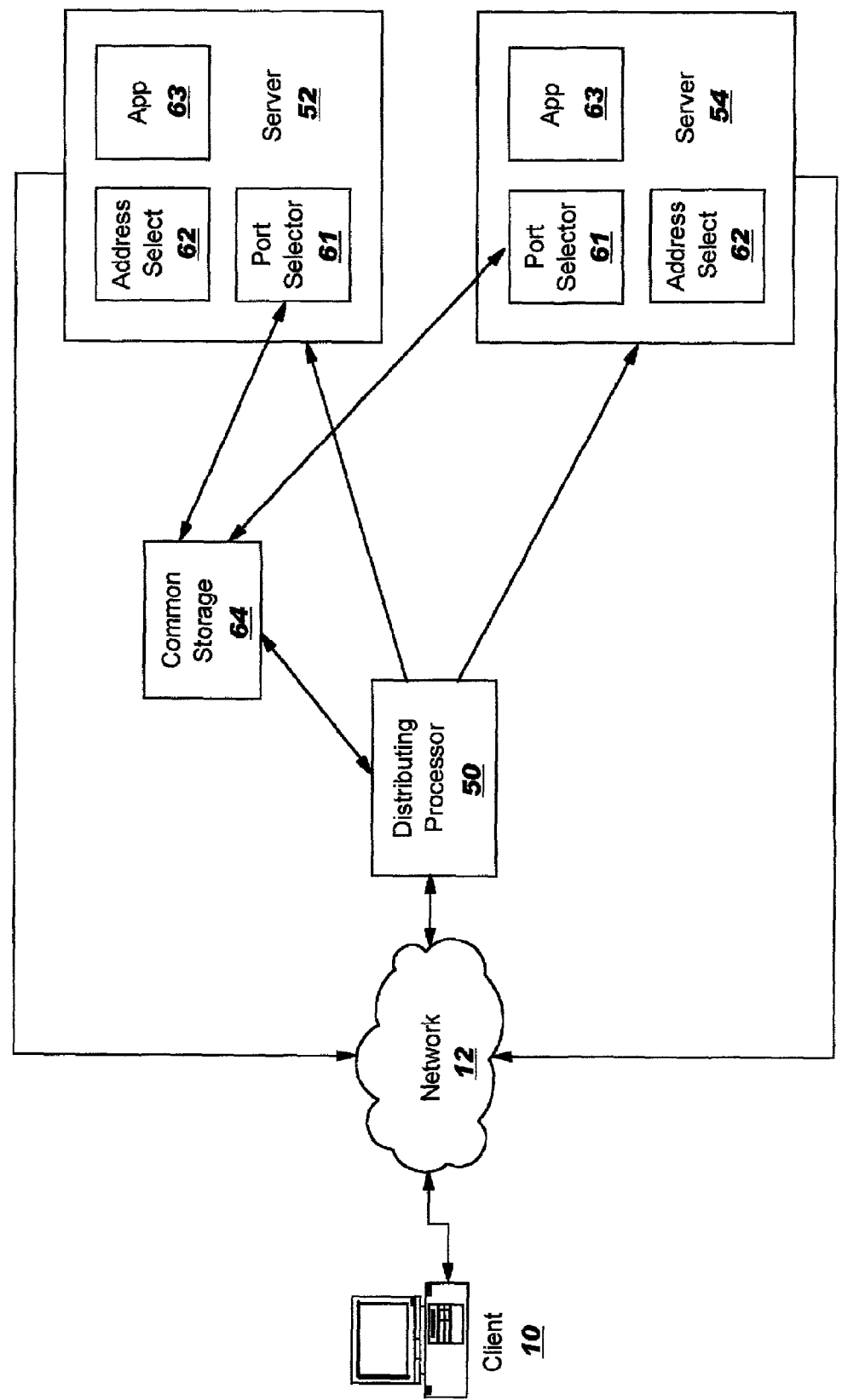
FIG. 1 is block diagram of a cluster of data processing systems incorporating embodiments of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. Furthermore, for references to a bit being set may refer to a bit being set as a "1" or a "0" value and being reset to a "0" or a "1" value respectively.

As will be appreciated by those of skill in the art, the present invention can take the form of an entirely hardware embodiment, an entirely software (including firmware, resident software, micro-code, etc.) embodiment, or an embodiment containing both software and hardware aspects all generally referred to herein as a "circuit" or "module." Furthermore, the present invention can take the form of a computer program product on a computer-usable or computer-readable storage medium having computer-usable or computer-readable program code means embodied in the medium for use by or in connection with an instruction execution system. In the context of this document, a computer-usable or computer-readable medium can be any means that can contain, store, communicate, propagate, or transport the program for use by or in connection with the instruction execution system, apparatus, or device.

The computer-usable or computer-readable medium can be, for example, but is not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a removable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner if necessary, and then stored in a computer memory.

Embodiments of the present invention will now be described with reference to FIGS. 1 through 10 which are flowchart and block diagram illustrations of operations of protocol stacks incorporating embodiments of the present invention. It will be understood that each block of the flowchart illustrations and/or block diagrams, and combinations of blocks in the flowchart illustrations and/or block diagrams, can be implemented by computer program instructions. These program instructions may be provided to a processor to produce a machine, such that the instructions which execute on the processor create means for implementing the functions/acts specified in the flowchart and/or block diagram block or blocks. The computer program instructions may be executed by a processor to cause a series of operational steps to be performed by the processor to produce a computer implemented process such that the instructions which execute on the processor provide steps for implementing the functions/acts specified in the flowchart and/or block diagram block or blocks.

Accordingly, blocks of the flowchart illustrations and/or block diagrams support combinations of means for performing the specified functions/acts, combinations of steps for performing the specified functions/acts and program instruction means for performing the specified functions/acts. It will also be understood that each block of the flowchart illustrations and/or block diagrams, and combinations of blocks in the flowchart illustrations and/or block diagrams, can be implemented by special purpose hardware-based systems which perform the specified functions/acts or steps, or combinations of special purpose hardware and computer instructions.

FIG. 1 illustrates an environment in which embodiments of the present invention may be utilized. As seen in FIG. 1, the client 10 communicates over the network 12 to communicate with a distributing processor 50. The distributing processor 50 may perform workload management and may distribute network communications for connections to a common IP address shared by the servers 52 and 54 such that the client 10 may communicate with any of the servers 52 or 54 utilizing the common IP address as a destination address. The distributing processor 50 may also function as a server and, thus, be the ultimate endpoint of communications with the client 10.

The servers 52 and 54, and the distributing processor 50 may be data processing systems in a cluster of data processing systems. The distributing processor 50 and the servers 52 and 54 may also provide for the movement of IP addresses such that an IP address may be moved from data processing system to data processing system. Accordingly, other data processing systems in the cluster may become the distributing processor for the IP address, for example, in the event of failure. The common IP address may, in certain embodiments, also be a dynamic IP address. Additionally, the common IP address and/or the dynamic IP address may also be virtual IP addresses.

In operation, when the distributing processor 50 receives communications from the client 10 to the common IP address, the distributing processor 50 routes these communications to appropriate ones of the servers 52 or 54. Outbound communications from the servers 52 or 54 need not be routed through the distributing processor 50. Furthermore, outbound connections to clients utilizing the common IP address may also be initiated without going through the distributing processor 50. For example, a connection utilizing the common IP address, such as a connection to the server 52, may have inbound communications routed through the distributing processor 50 and to the server 52 while outbound communications are routed from the server 52 to the network 12 without passing through the distributing processor 50. Similarly if the server 52 initiates a connection, this connection may be initiated directly onto the network 12.

FIG. 1 also illustrates a common storage 64 which may be utilized by a port selector module or circuit 61 which may select a port for use by outbound connections utilizing the common IP address as a source address for the connection based on port status information contained in the common storage 64. The port status information may be maintained by the port selector module(s) or circuit(s) 61 so as to provide up-to-date information on the availability of a port for a given common IP address. Such port selector modules 61 may operate as described herein, possibly in cooperation with other port selector modules 61 on processing systems in the cluster, and, thereby, coordinate selection of ports for the common IP address so as to provide a port which results in a unique identification, such as a unique 4-tuple (source address, source port, destination address, destination port), for each connection utilizing the common IP address. Furthermore, cluster-wide port assignment according to embodiments of the present invention may be provided alone or in combination with source address selection as described herein.

As will be appreciated by those of skill in the art, while the common storage 64 may be utilized to share information which may allow cluster-wide coordinated assignment of ports, other such information sharing techniques may also be utilized. For example, information could be broadcast or otherwise transmitted to processors and the information maintained at each processor using cluster-wide port assignment. Similarly, the processors could broadcast or otherwise transmit the information to the distributing processor which could maintain port information for each common IP address for which it had distribution responsibilities. Accordingly, other mechanisms for sharing information to provide cluster-wide port assignments may be utilized while still benefitting from the teachings of the present invention.

FIG. 1 also illustrates the servers 52 and 54 having a source address selection module or circuit 62. The source address selection module or circuit 62 may function as described herein to associate predefined common IP addresses with a particular instance of an application, such as the application 63 illustrated in FIG. 1. Such an association may allow an application which does not specify a source address for an outbound connection to utilize the common IP address for the outbound connection. Thus, even if an application is moved from one server to another, the same common IP address may be utilized. Such may be accomplished without requiring the application to specify the particular IP address. Accordingly, portability and/or flexibility of the application between servers in a cluster and/or cluster configuration may be improved. Furthermore, address selection according to embodiments of the present invention may be provided alone or in combination with cluster-wide port assignment as described herein.

While the present invention is described above with reference to servers, such servers may also be referred to as hosts, target hosts or target data processing systems and represent an endpoint for communications from the network. Similarly, the distributing processor may be a data processing system or other network device, or portion thereof, capable of carrying out the operations described herein.

Figure 2:
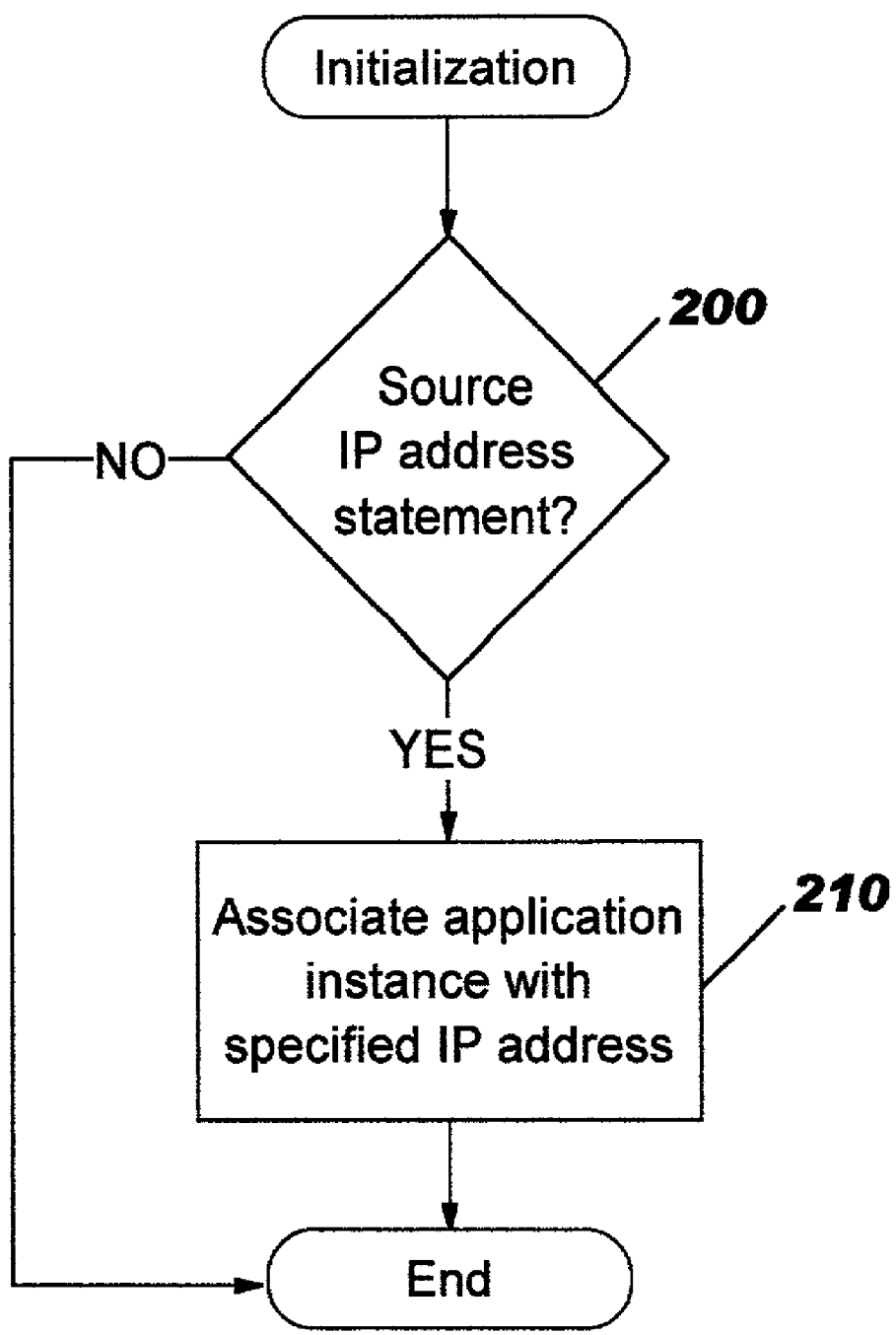
FIG. 2 is a flowchart illustrating initialization operations according to embodiments of the present invention for source address selection.

Operations for initialization of a source address selection module or circuit 62 according to embodiments of the present invention will now be described with reference to FIG. 2. As seen in FIG. 2, it may be determined if a configuration specification for a data processing system, for example for a communication protocol stack of the data processing system, includes a statement which identifies a source IP address and one or more application instances which are associated with the source IP address (block 200). If so, the data processing system associates the application instance(s) and the specified source IP address (block 210). Such associations may be provided on multiple data processing systems and, in fact, the same source IP address may be associated with application instances on different data processing systems.

Figure 3:
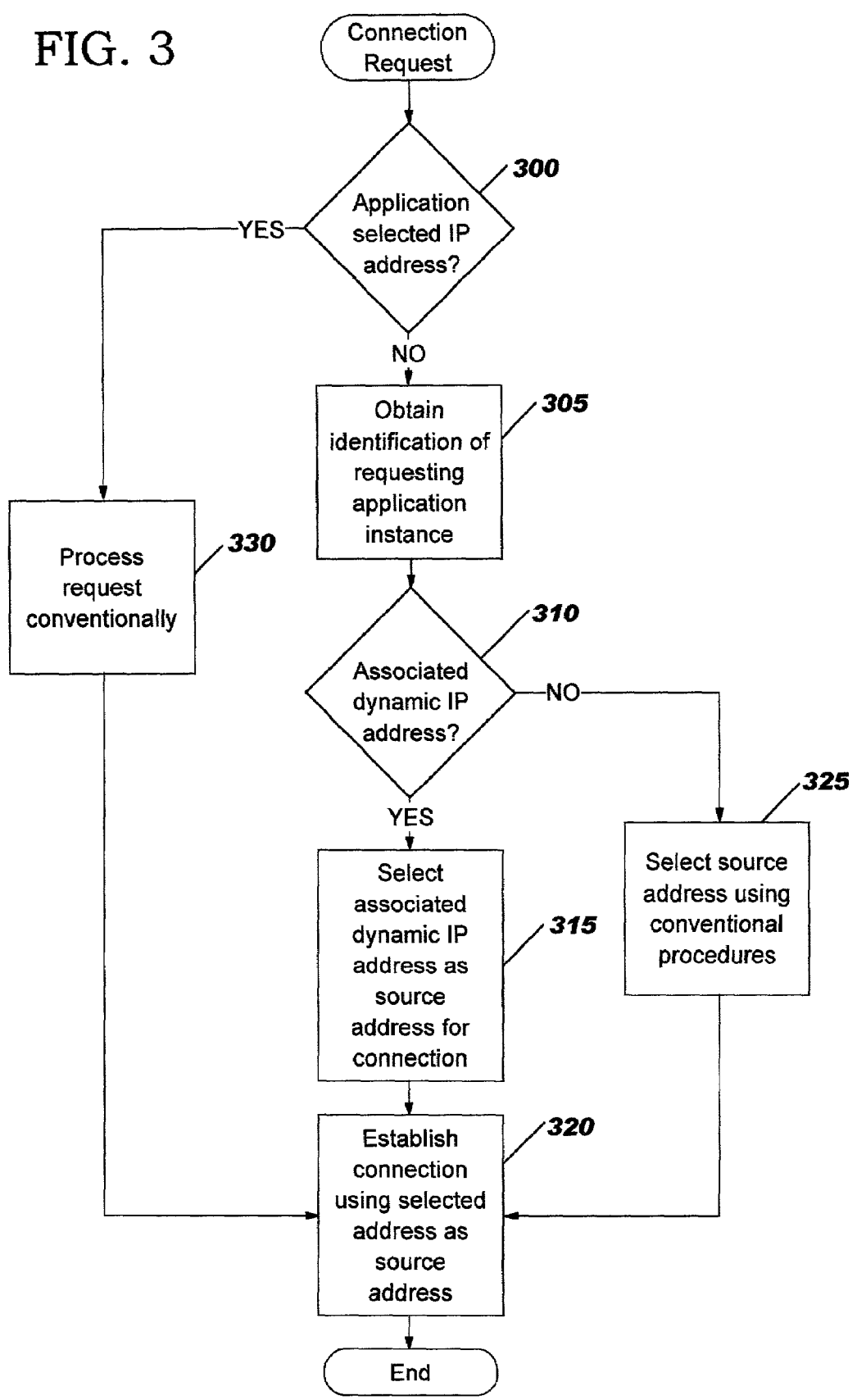
FIG. 3 is a flowchart illustrating operations for source address selection according to embodiments of the present invention.

FIG. 3 illustrates operations of an address selection module or circuit 62 for source address selection for an outbound connection request according to embodiments of the present invention. As seen in FIG. 3, it is determined if the application instance requesting the outbound connection has specified an IP address for the connection, for example, by binding the socket for the connection to a specific IP address (block 300). If the application did specify an IP address, the connection request is processed in a conventional manner (block 330) and the connection established utilizing the IP address selected by the application (block 320). If, however, the application instance has not specified an IP address (block 300), an identification of the application instance is obtained (block 305) to determine if a dynamic IP address is associated with the application instance (block 310). If a dynamic IP address is associated with the application instance (block 310), the associated dynamic IP address is selected as the source address for the connection (block 315) and the connection is established using the selected address as the source address (block 320).

If a dynamic IP address is not associated with the application (block 310), a source IP address is selected utilizing conventional address selection procedures (e.g. specification of a static VIPA via a SOURCEVIPA statement) (block 325) and the connection is established using the conventionally selected address as the source address (block 320). However, other operations may be carried out, for example, an error message may be generated or other mechanisms for selecting a source address for the connection request could be carried out. Such operations are beyond the scope of the present invention and, therefore, will not be described further herein.

Figure 4:
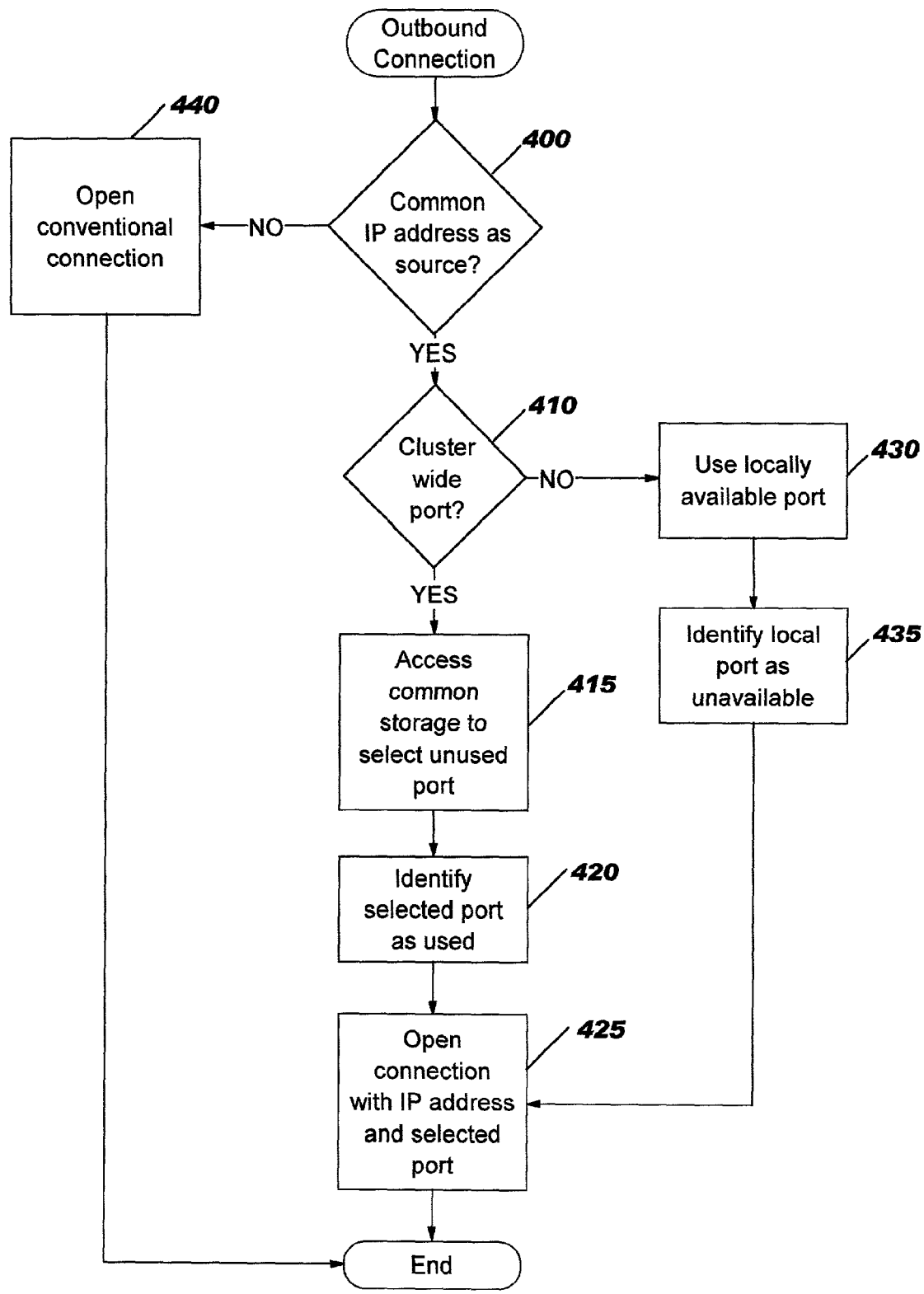
FIG. 4 is a flowchart illustrating operations for port selection for shared addresses according to embodiments of the present invention.

FIG. 4 illustrates operations of a port selector module or circuit 61 for cluster-wide port assignment according to embodiments of the present invention. As seen in FIG. 4, the source address of an outbound connection request is evaluated to determine if a common IP address is specified as the source address (block 400). If the source address is not a common IP address (block 400), conventional port assignment may be utilized and the connection opened using conventional techniques (block 440). If, however, the source address is a common IP address (block 400), it may be determined if cluster-wide port assignment is provided for the common IP address (block 410). If cluster-wide port assignment is not provided for the common IP address (block 410), a local port assignment process may be used to select a port which is identified locally as available (block 430) and the selected port may be identified locally as unavailable (block 435) and the connection opened utilizing the selected port (block 425).

If however, cluster-wide port assignment is provided for the common IP address (block 410), the common storage 64 is accessed to select an unused port for the connection (block 415). The selected port is identified in the common storage 64 as used or unavailable (block 420) so that other data processing systems will not select the same port. The connection is then opened using the common IP address and the selected port (block 425).

Figure 5:
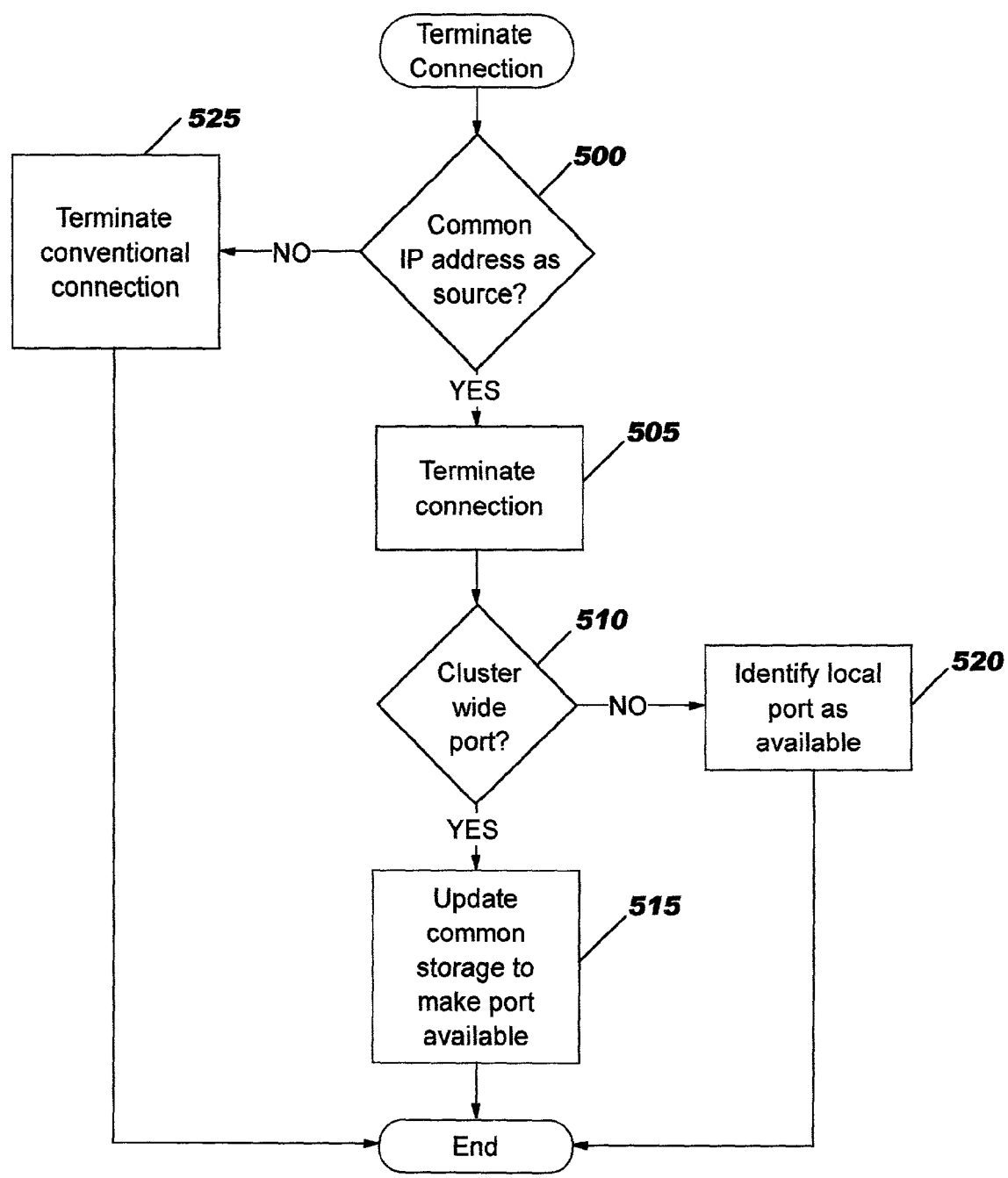
FIG. 5 is a flowchart illustrating operations for termination of a connection utilizing port selection according to embodiments of the present invention.

FIG. 5 illustrates operations of the port selector module or circuit 61 when a connection is terminated. As seen in FIG. 5, the source address of the connection is evaluated to determine if a common IP address is specified as the source address (block 500). If the source address is not a common IP address (block 500), conventional connection termination may be utilized (block 525). If, however, the source address is a common address (block 500), the connection may be terminated (block 505) and it may be determined if cluster-wide port assignment is provided for the common IP address (block 510). If cluster-wide port assignment is not provided for the common IP address (block 510), the port is identified locally as available (block 520). If, however, cluster-wide port assignment is provided for the common IP address (block 510), the common storage 64 is accessed and updated to reflect that the port is now an unused port (block 515) so as to make the port available for use in a subsequent connection.

In particular embodiments of the present invention, source address selection and/or cluster-wide port assignments may be provided in a Sysplex cluster utilizing Sysplex Distributor. The Sysplex Distributor was provided in OS/390 V2R10 (General Availability of September, 2000) and is described in detail in commonly assigned U.S. patent application Ser. No. 09/640,409, entitled "METHODS, SYSTEMS AND COMPUTER PROGRAM PRODUCTS FOR CLUSTER WORKLOAD DISTRIBUTION", U.S. patent application Ser. No. 09/640,412, entitled "METHODS, SYSTEMS AND COMPUTER PROGRAM PRODUCTS FOR NON-DISRUPTIVELY TRANSFERRING A VIRTUAL INTERNET PROTOCOL ADDRESS BETWEEN COMMUNICATION PROTOCOL STACKS" and U.S. patent application Ser. No. 09/640,438, entitled "METHODS, SYSTEMS AND COMPUTER PROGRAM PRODUCTS FOR FAILURE RECOVERY FOR ROUTED VIRTUAL INTERNET PROTOCOL ADDRESSES", the disclosures of which are incorporated herein by reference as if set forth fully herein.

In Sysplex Distributor, a single IP address is associated with a plurality of communication protocol stacks in a cluster of data processing systems by providing a routing protocol stack which associates a Virtual IP Address (VIPA) and port with other communication protocol stacks in the cluster and routes communications to the VIPA and port to the appropriate communication protocol stack. VIPAs capable of being shared by a number of communication protocol stacks are referred to herein as "dynamic routable VIPAs". While the present invention is described with reference to a specific embodiment in a System/390 Sysplex, as will be appreciated by those of skill in the art, the present invention may be utilized in other systems where clusters of computers utilize virtual addresses by associating an application or application group, rather than a particular communications adapter, with the addresses. Thus, the present invention should not be construed as limited to the particular exemplary embodiments described herein.

Figure 6:
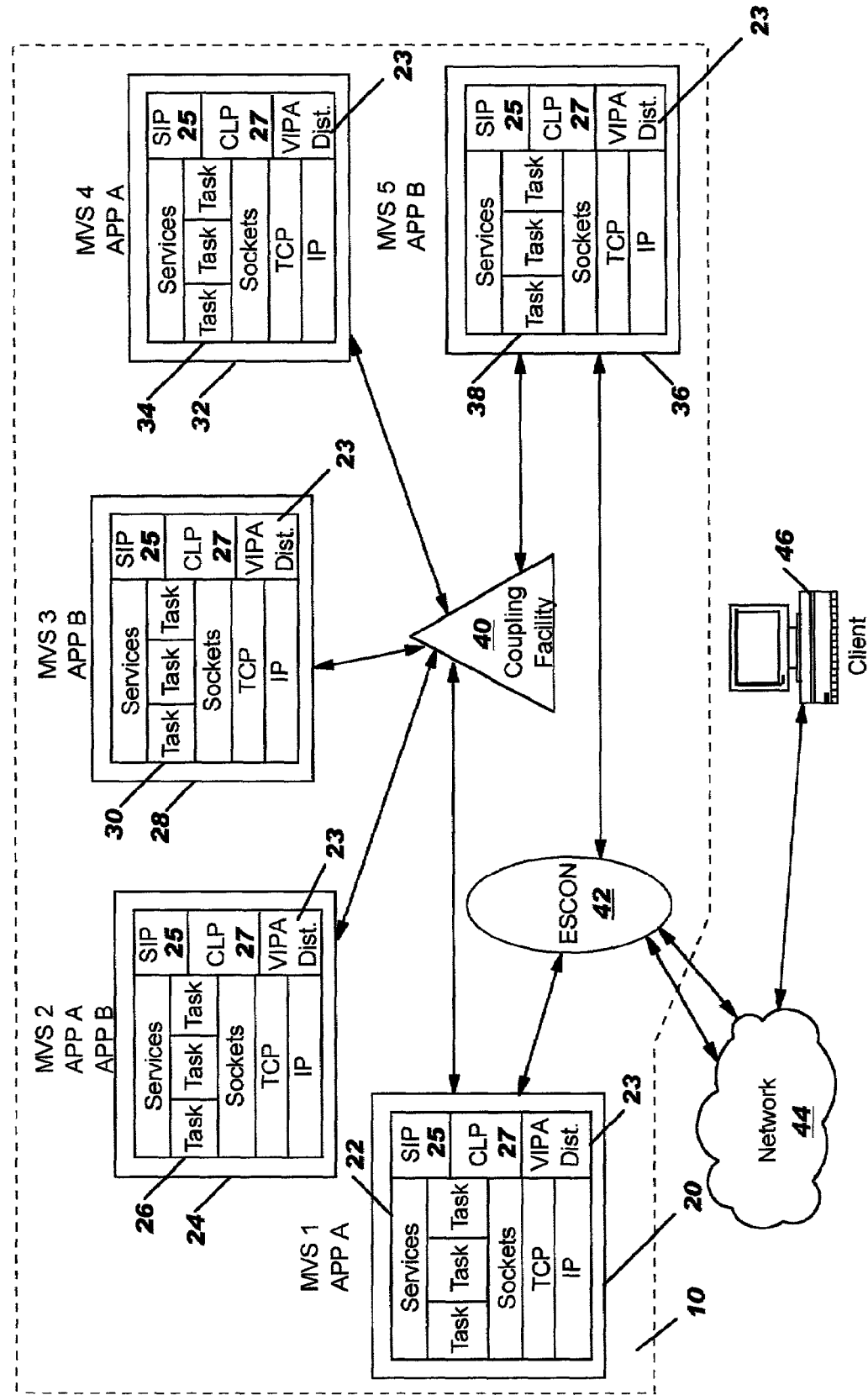
FIG. 6 is a block diagram of a CS/390 Sysplex incorporating Sysplex Distributor incorporating Sysplex Wide Security Associations according to embodiments of the present invention.

A cluster of data processing systems is illustrated in FIG. 6 as a cluster of nodes in Sysplex 10. As seen in FIG. 6, several data processing systems 20, 24, 28, 32 and 36 are interconnected in a Sysplex 10. The data processing systems 20, 24, 28, 32 and 36 illustrated in FIG. 6 may be operating system images, such as MVS images, executing on one or more computer systems. While the present invention will be described primarily with respect to the MVS operating system executing in a System/390 environment, the data processing systems 20, 24, 28, 32 and 36 may be mainframe computers, mid-range computers, servers or other systems capable of supporting dynamic routable Virtual IP Addresses as described herein.

As is further illustrated in FIG. 6, the data processing systems 20, 24, 28, 32 and 36 have associated with them communication protocol stacks 22, 26, 30, 34 and 38, which may be TCP/IP stacks. The communication protocol stacks 22, 26, 30, 34 and 38 have been modified to incorporate a VIPA distribution function 23 as described herein for providing dynamic routable VIPAs so as to provide a single IP address for multiple communication protocol stacks.

While each of the communication protocol stacks 22, 26, 30, 34 and 38 illustrated in FIG. 6 incorporate the VIPA distribution function 23, not all communication protocol stacks in a Sysplex need incorporate the VIPA distribution function 23. Thus, the present invention may be carried out on any system where two or more communication protocol stacks in a cluster of data processing systems support dynamic routable VIPAs.

As is further seen in FIG. 6, the communication protocol stacks 22, 26, 30, 34 and 38 may communicate with each other through a coupling facility 40 of the Sysplex 10, for example, utilizing XCF messaging. Furthermore, the communication protocol stacks 22 and 38 may communicate with an external network 44 such as the Internet, an intranet, a Local Area Network (LAN) or Wide Area Network (WAN) utilizing the Enterprise System Connectivity (ESCON) 42. Thus, a client 46 may utilize the network 44 to communicate with an application executing on an MVS image in Sysplex 10 through the communication protocol stacks 22 and 38 which may function as routing protocol stacks as described herein.

As is further illustrated in FIG. 6, as an example of utilization of the present invention and for illustration purposes, data processing system 20 has associated with it communication protocol stack 22 which is associated with MVS image MVS1 which has application APP A executing on MVS image MVS1 and utilizing communication protocol stack 22 to allow access to, for example, client 46 through network 44. Similarly, data processing system 24 has associated with it communication protocol stack 26 which is associated with MVS image MVS 2 which has a second instance of application APP A and an instance of application APP B executing on MVS image MVS 2 which may utilize communication protocol stack 26 for communications. Data processing system 28 has associated with it communication protocol stack 30 which is associated with MVS image MVS3 which has a second instance of application APP B executing on MVS image MVS 3 which may utilize communication protocol stack 30 for communications. Data processing system 32 has associated with it communication protocol stack 34 which is associated with MVS image MVS4 which has a third instance of application APP A executing on MVS image MVS 4 which may utilize communication protocol stack 34 for communications. Finally, data processing system 36 has associated with it a communication protocol stack 38 which is associated with MVS image MVS5 which has a third instance of application APP B executing on MVS image MVS5 which may utilize communication protocol stack 38 for communications. Furthermore, each of the communication protocol stacks 22, 26, 30, 34 and 38 are illustrated as including an IP address selection module or circuit (SIP) 25 and a cluster-wide port assignment module or circuit (CLP) 27.

Utilizing the above described system configuration as an example, the VIPA distribution function 23 with cluster-wide port assignment and/or source IP address selection will now be described. The VIPA distribution function 23 allows for protocol stacks which are defined as supporting DVIPAs to share the DVIPA and communicate with the network 44 through a routing protocol stack such that all protocol stacks having a server application which is associated with the DVIPA will appear to the network 44 as a single IP address. Such dynamically routable VIPAs may be provided by designating a protocol stack, such as protocol stack 22, as a routing protocol stack, notifying other protocol stacks of the routing protocol stack and having other protocol stacks notify the routing protocol stack when an application which binds to the DVIPA is started.

The communication protocol stacks 22, 26, 30, 34 and 38 may be configured as to which stacks are routing stacks, backup routing stacks and server stacks. Different DVIPAs may have different sets of backup stacks, possibly overlapping. The definition of backup stacks may be the same as that for the VIPA takeover function described in U.S. patent application Ser. No. 09/401,419, entitled "METHODS, SYSTEMS AND COMPUTER PROGRAM PRODUCTS FOR AUTOMATED MOVEMENT OF IP ADDRESSES WITHIN A CLUSTER" which is incorporated herein by reference as if set forth fully herein.

Utilizing the system illustrated in FIG. 6 for the present example, the application APP A is associated with a DVIPA VA1 which may be associated with the respective first, second and third instances of APP A; and application APP B likewise has a DVIPA VB1 associated with the respective first, second and third instances of APP B.

Configuration of a dynamic routable VIPA may be provided by a definition block established by a system administrator for each routing communication protocol stack 22 and 38. Such a definition block is described in the above referenced United States Patent Applications and defines dynamic routable VIPAs for which a communication protocol stack operates as the primary communication protocol stack. Backup protocol stacks may be defined as described for the VIPA takeover procedure. Thus, the definition block "VIPADynamic" may be used to define dynamic routable VIPAs. Within the VIPADynamic block, a definition may also be provided for a protocol stack supporting moveable VIPAs. All of the VIPAs in a single VIPADEFine statement should belong to the same subnet, network, or supernet, as determined by the network class and address mask. VIPAs may also be defined as moveable VIPAs which may be transferred from one communication protocol stack to another.

Similarly, within the definitions, a protocol stack may be defined as a backup protocol stack and a rank (e.g. a number between 1 and 254) provided to determine relative order within the backup chain(s) for the associated dynamic routable VIPA(s). A communication protocol stack with a higher rank will take over the dynamic VIPAs before a communication protocol stack with a lower rank.

Within the VIPADYNamic block, a VIPA may be defined as a dynamic routable VIPA based on a VIPA address and a portlist which is a list of ports for which the DVIPA will apply. Alternatively, all ports may be considered to be usable for workload distribution when used with a dynamic routable VIPA. Also provided in the definition is a list of protocol stacks which will be included as server stacks in routing communications directed to the DVIPA. The IP addresses which define the potential server stacks may be XCF addresses of the protocol stacks or may be designated "ALL." If "ALL" is designated, then all stacks in the Sysplex are candidates for distribution. This may include future stacks which are not active when the routing stack is initialized. Thus, if ALL is specified, a protocol stack may be added to the DVIPA without disruption of operations and without user intervention to redefine the stack in the VIPA-Dynamic block. In addition to the above definitions, a range of IP addresses may be defined as DVIPAs utilizing the VIPARange definition. At initialization or profile changes, the communication protocol stacks 22, 26, 30, 34 and 38 communicate to partner communication protocol stacks the complete list of dynamic routable VIPAs, their associated potential servers and list of ports and the primary and backup definitions for the communication protocol stack.

When a communication protocol stack 22, 26, 30, 34, 38 receives the DVIPA information it notes if it is identified as a candidate target protocol stack or as a backup stack. If the receiving communication protocol stack is a candidate target stack, it monitors its applications and sends a message to the defined routing stack when an application instance is bound to the DVIPA and listens on a defined port. If the receiving communication protocol stack is a backup stack, it stores the DVIPA information for use in the event of failure of the primary routing stack.

In addition to the conventional configuration statements provided for dynamically routeable VIPAs, an additional configuration statement is provided to provide source address selection for DVIPAs according to embodiments of the present invention. Thus, a configuration statement of the form:

SOURCEIPA ipaddr job [job . . . ], may be provided.

The first parameter, ipaddr, is a Dynamic VIPA which is either (a) configured on the same TCP/IP stack with VIPA-DEFINE or VIPABACKUP, (b) falls within a range of DVIPAs specified in a VIPARANGE statement on the same stack, (c) is a Distributed DVIPA specified in a VIPADIS-TRIBUTE statement where the TCP/IP stack of the SOURCEIPA statement is a target stack for the Distributed DVIPA, or (d) is already defined on the stack at the time the SOURCEIPA configuration statement is processed.

The second parameter (and subsequent parameters) are used to identify an application instance or a group of application instances to be associated with ipaddr, using the same syntax and semantics as the jobname parameter of the current PORT statement. The PORT statement on TCP/IP generally allows a port and/or IP address of a particular application to be characterized and restricted. The application may be identified by job name, the user ID under which the job is executed, or a group of user IDs.

As described in more detail below, when an application instance identified in a SOURCEIPA configuration statement initiates an outbound connection, and does not bind the socket to a particular source address before initiating the connection request, the communications protocol stack may use the designated ipaddr as the source address instead of normal SOURCEVIPA processing or using the IP address of the selected outbound link. If the IP address is not active at the time of the connection request, but lies within a range of IP addresses specified by VIPARANGE, the address will be activated as a Dynamic VIPA.

Thus, a system administrator may configure a particular application to use a particular IP address on all TCP/IP stacks where an instance of the application might execute, now or in the future (allowing for application movement, whether planned or failure to restart on another stack), when the IP address is a Dynamic VIPA. An application on a TCP/IP stack may be configured to use the appropriate DVIPA as the source IP address for outbound connections, independent of any other applications on the same stack. If an application consists of more than one instance, they may all be configured to use the same source IP address for outbound connections. The system administrator may configure different application to use a different IP address.

In addition to the inclusion of the new SOURCEIPA statement, to provide cluster-wide port assignment. the VIPADEFINE and VIPARANGE statements may be modified to include a new keyword: CLUSTERPORTS. As described in more detail below, when a DVIPA is activated via VIPADEFINE with CLUSTERPORTS, a corresponding structure is created in the coupling facility 40 if it does not already exist, and an entry is created for the DVIPA if such an entry does not already exist. If CLUSTERPORTS is added via VARY OBEY, when the DVIPA is already active, the stack will scan the connection table, and indicate as in use all port numbers that are already used as local ports in a connection using the DVIPA. If this DVIPA is also a Distributed DVIPA, then the routing stack will also examine the Connection Routing Hash Table (CRHT) and update the coupling facility entry on behalf of all target stacks.

When a VIPARANGE configuration statement with the CLUSTERPORTS keyword is processed, the communication protocol stack searches its list of IP addresses to find active ones within the designated range. For each such IP address, the connection table is searched for connections to the DVIPA, and the coupling facility structure and corresponding entry are created as described above with reference to the VIPADEFINE.

Returning to the example of FIG. 6, for MVS1 to MVS5, the VIPADEFine statements may be:

MVS1: VIPADEFine MOVEable IMMEDiate CLUSTERPORTS DVA1 VIPADISTribute DVA1 PORT 60 DESTIP XCF1, XCF2, XCF4 SOURCEIPA DVA1 APPA MVS5: VIPADEFine MOVEable IMMEDiate CLUSTERPORTS DVB1 VIPADISTribute DVB1 PORT 60 DESTIP ALL VIPADISTribute DVA1 PORT 60 DESTIP XCF2, XCF3, XCF4 SOURCEIPA DVA1 APPA SOURCEIPA DVB1 APPB For purposes of illustration, the respective address masks have been omitted because they are, typically, only significant to the routing daemons.

In the above illustration, XCF1 is an XCF address of the TCP/IP stack on MVS1, XCF2 is an XCF address of the TCP/IP stack on MVS2 and XCF3 is an XCF address of the TCP/IP stack on MVS4. Note that, for purposes of the present example, definitions for MVS2, MVS3, and MVS4 are not specified. Such may be the case because the protocol stacks for these MVS images are candidate target protocol stacks and are not identified as routing protocol stacks and, therefore, receive their dynamic routable VIPA definitions from the routing protocol stacks. As such, MVS2, MVS3 and MVS4 may include SOURCEIPA statements for the DVIPAs for which they are target communication protocol stacks. Thus, MVS2, MVS3 and MVS4 may include the following statements:

MVS2: SOURCEIPA DVA1 APPA SOURCEIPA DVB1 APPB

MVS3: SOURECEIPA DVB1 APPB

MVS4: SOURCEIPA DVA1 APPA

Additional VIPA definitions may also be provided, however, in the interests of clarity, such definitions have been omitted.

Operations for source IP address selection and cluster-wide port assignment will now be described with reference to the above described example and to the flowcharts of FIGS. 7 through 10. Operations for initialization of the source selection aspects of the present invention, e.g. processing of the above definition statements, are substantially the same as described with reference to FIG. 2. In such initialization, the source IP address statements may be the SOURCEIPA statements described above.

Figure 7:
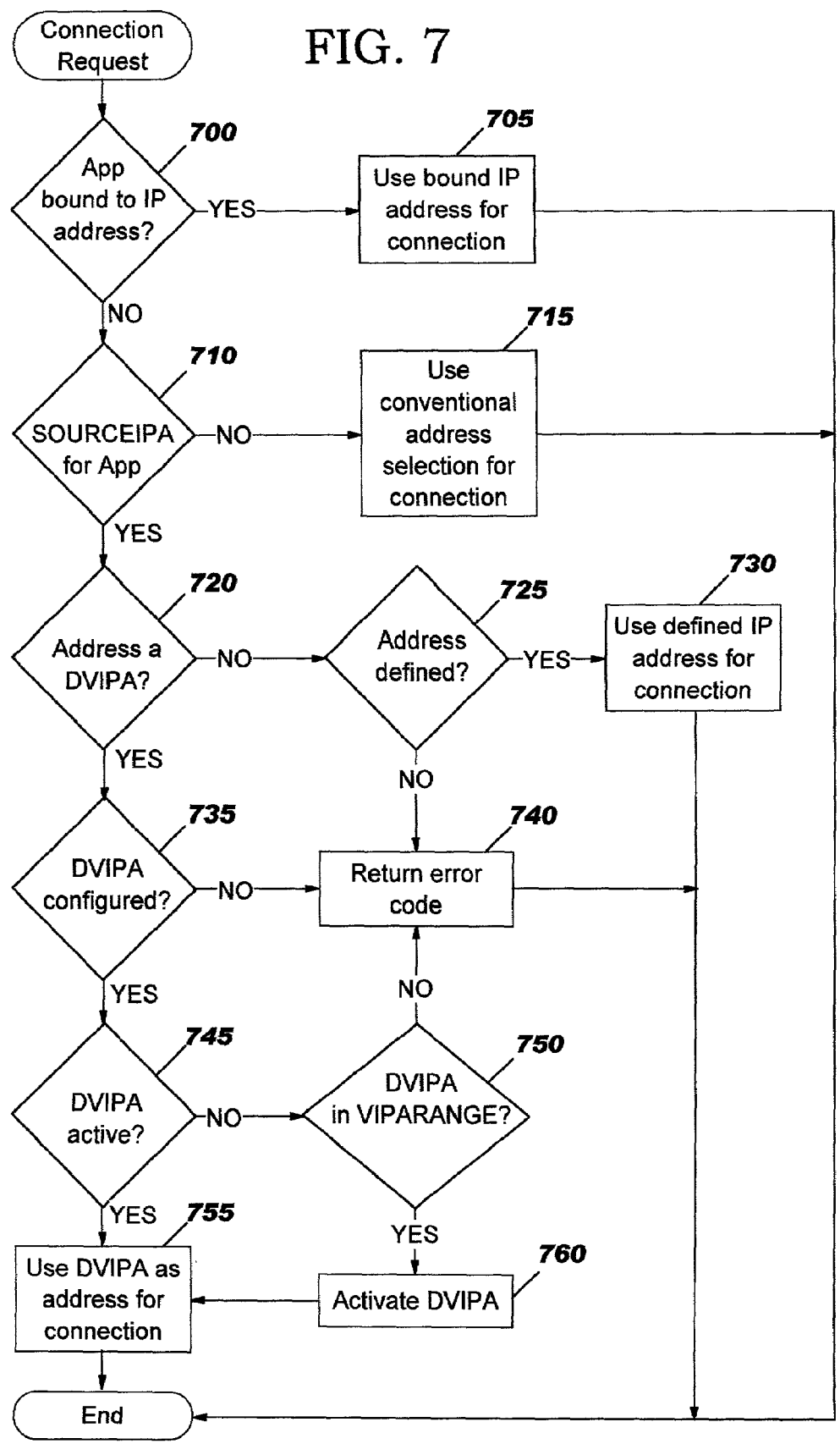
FIG. 7 is a flowchart illustrating operations for source address selection of a distributed virtual Internet Protocol address (DVIPA) according to embodiments of the present invention.

Turning to FIG. 7, operations for selection of a source IP address according to embodiments of the present invention are illustrated. As seen in FIG. 7, when a request for an outbound connection is received, it is determined if the application has bound the socket for the connection to specified IP address (block 700). If so, the IP address to which the socket is bound is used for the IP address of the connection (block 705). If the socket for the connection has not been bound to a specific IP address (block 700), it is determined if a SOURCIPA statement has been included for the application requesting the connection (block 710). If no SOURCEIPA statement is included for the application (block 710), conventional address selection may be utilized (block 715).

If a SOURCEIPA statement is included for the application (block 710), it is determined if the specified address is a DVIPA (block 720). If the specified address in the SOURCEIPA statement is not a DVIPA (block 720), it is determined if the specified address has previously been defined for the communication protocol stack receiving the request (block 725). If not, an error code may be returned in response to the connection request (block 740) and operations terminate. If the specified address has previously been defined for the communication protocol stack receiving the request (block 725), the specified address is used for the connection (block 730).

Returning to block 720, if the specified address in the SOURCEIPA statement is a DVIPA, it is determined if the DVIPA has been configured on the communication protocol stack receiving the request (block 735). If not, an error code may be returned in response to the connection request (block 740) and operations may be terminated. If the DVIPA is configured (block 735), it is determined if the DVIPA is active on the communication protocol stack receiving the request (block 745). If the DVIPA is active, the DVIPA is used as the source address for the connection (block 755). If not, it is determined if the DVIPA is within a range of a VIPARANGE statement for the communication protocol stack (block 750). If not, an error code may be returned (block 740) and operations may be terminated. If the DVIPA is within a range of a VIPARANGE statement for the communication protocol stack (block 750), the DVIPA is activated (block 760) and the DVIPA is used as the source address for the connection (block 755).

Returning to the example of FIG. 6, if MVS2 receives a connection request from APP A for a socket which is not bound to a specific IP address the SIP module 25 of communication protocol stack 26 will select DVA1 as the source address for the connection request. This is because MVS2 has a SOURCEIPA statement which identifies DVA1 as a DVIPA for use with APP A and the communication protocol stack 26 is identified as a target communication protocol stack in a VIPADISTribute statement. Furthermore, as described in more detail below, because DVA1 is defined with the CLUSTERPORTS parameter, the CLP module 27 of the communications protocol stack 26 will carry out the operations described below to select an ephemeral port for the connection.

As described above, collaboration among cluster communication protocol stacks may be needed to ensure unique connection 4-tuples when multiple instances of the same application, running on multiple stacks, connect to the same external server (same external IP address and port). This coordination may be accomplished using the coupling facility 40 or other shared-memory facility. A structure may be defined for the CF 40 for this purpose, with an entry for each unique DVIPA. The entry will contain a structure (which could, for example, be a bit map) that indicates which ephemeral ports are currently in use for outbound TCP connections using the DVIPA as a source IP address.

While operations for selecting a source address are illustrated in FIG. 7 in a particular order, other sequences of operations could also be utilized. For example, block 720 could check for an active DVIPA and, if active, operations could continue at block 755 with selection of the active DVIPA as the source address. If the address was not an active DVIPA the operations at block 725 and after could be modified to be determined if the address was defined as a static VIPA or if it was defined in a VIPARANGE statement. If the address was a static VIPA it would be selected as the source address. If the address was defined by a VIPARANGE statement the DVIPA would be activated. Thus, embodiments of the present invention should not be construed as limited to the particular sequence of operations illustrated in FIG. 7 but is intended to cover any sequence of operations which allows for the selection of a DVIPA as a source address for a connection.

Figure 8A:
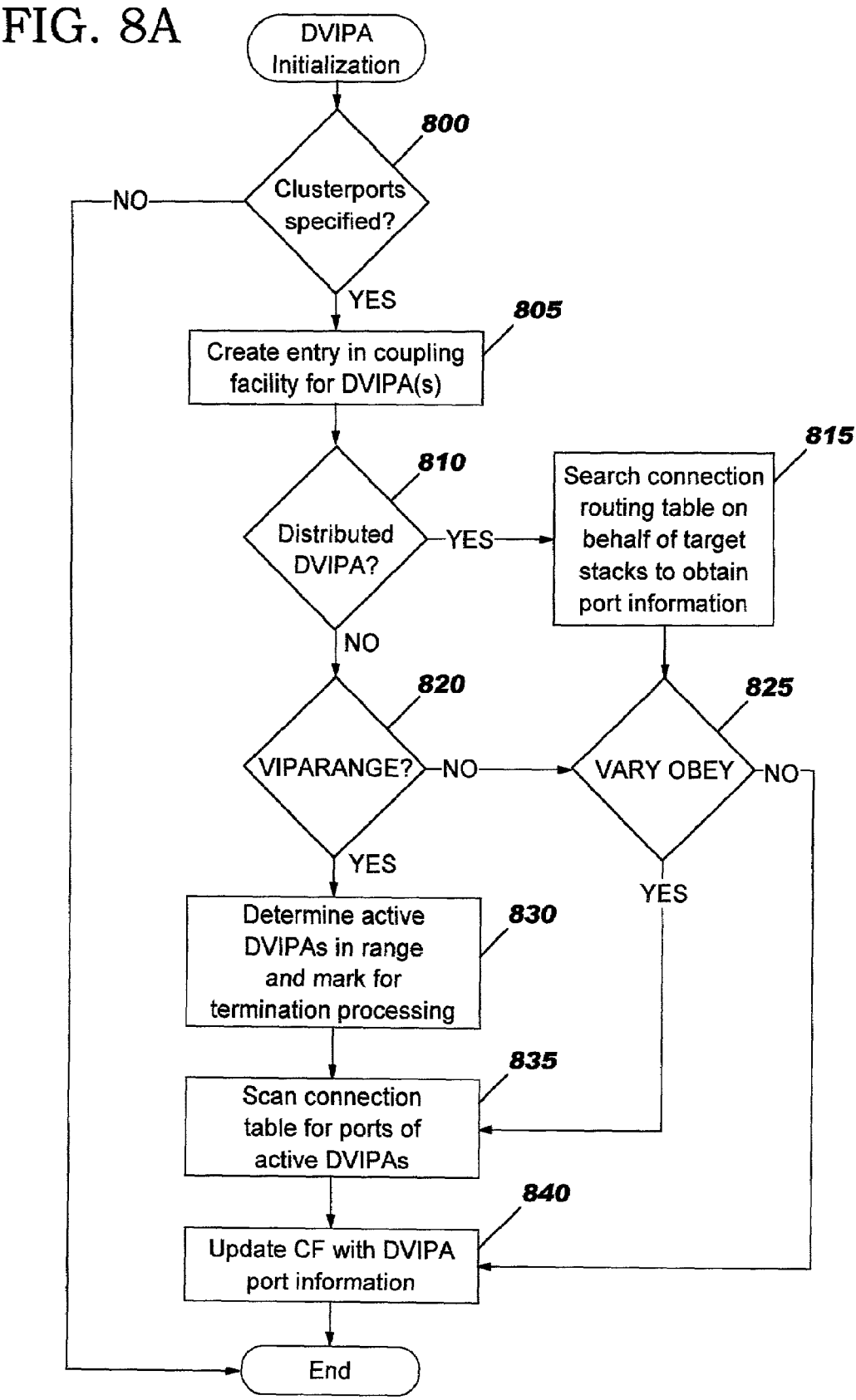
FIG. 8A is a flowchart illustrating operations for initialization of cluster-wide port assignment according to embodiments of the present invention.

FIG. 8A illustrates operations for initialization of the cluster-wide port assignment according to embodiments of the present invention. As seen in FIG. 8A, it is determined if CLUSTERPORTS is specified for the DVIPA being initialized (block 800). As described above, this may be accomplished by including the CLUSTERPORTS parameter in a VIPADEFine statement. If CLUSTERPORTS is not specified for the DVIPA (block 800), then operations according to embodiments of the present invention may terminate. If CLUSTERPORTS is specified (block 800), an entry is created in a structure in the coupling facility 40 for the DVIPA or DVIPAs (block 805). As described above, the structure will keep track of the availability of ports for the DVIPA. In particular, the structure may take the form of a bitmap for each DVIPA with each bit corresponding to a port such that, for example, a "1" in the bit location indicates a port is available and a "0" indicates that a port is unavailable.

It is also determined if the DVIPA is a distributed DVIPA (block 810). Such may be the case, for example, if a VIPADISTribute statement is associated with the DVIPA. If the DVIPA is a distributed DVIPA (block 810), the connection routing table for the DVIPA is searched on behalf of the target stacks to obtain port information for connections to the target stacks (block 815). If the CLUSTERPORTS parameter is added via a VARY OBEY (block 825), the connection table of the communication protocol stack is scanned for ports of active DVIPAs (block 835) and the coupling facility is updated with the port information obtained at block 815 and/or block 835 (block 840).

Returning to block 810, if the DVIPA is not a distributed DVIPA, it is determined if the CLUSTERPORTS parameter is part of a VIPARange statement (block 820). If not, operations continue with block 825 as described above. If the CLUSTERPORTS is part of a VIPARange statement (block 820), all active DVIPAs are determined and marked for termination processing (block 830). Again, the connection table is scanned for ports of active DVIPAs (block 835) and the coupling facility 40 is updated with the DVIPA port information (block 840).

Figure 8B:
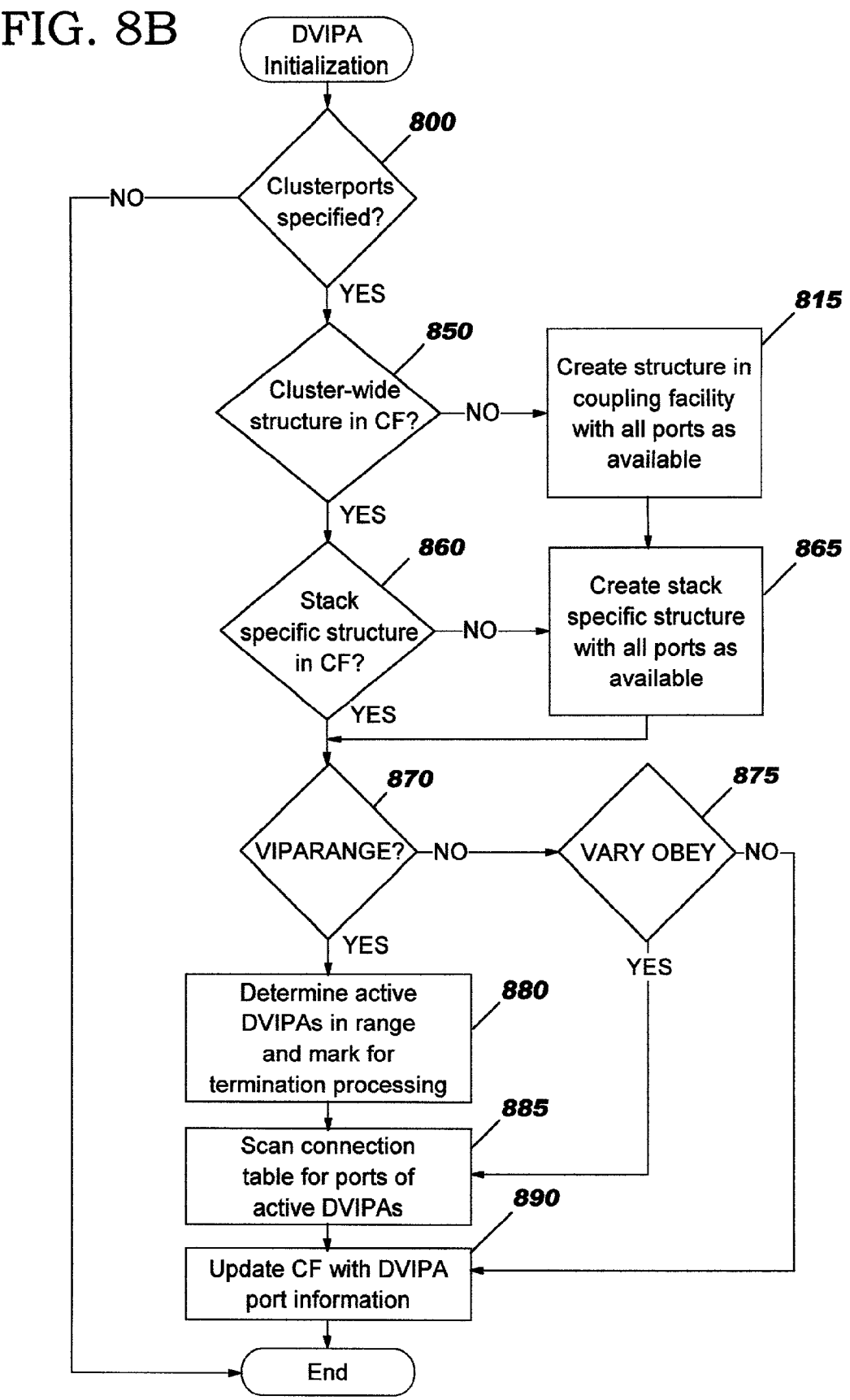
FIG. 8B is a flowchart illustrating operations for initialization of cluster-wide port assignment with error recovery according to embodiments of the present invention.

FIG. 8B illustrates operations for initialization of the cluster-wide port assignment which may also provide for error recovery for distribute VIPAs (e.g. DRVIPAs) according to embodiments of the present invention. The embodiments illustrated in FIG. 8B provide a cluster-wide port availability structure in the coupling facility 40 for each DVIPA for which CLUSTERPORTS is specified and a stack specific port usage structure which indicates which ports are used by which stacks for which the DVIPA is defined. As described in more detail below, the stack specific port information may be used in the event of the failure of a stack to update the cluster-wide port availability structure to make the ports of the failed stack available for use. The operations of FIG. 8B may be carried out by both the routing communication protocol stack and the target communication protocol stacks of the DRVIPA.

As seen in FIG. 8B, it is determined if CLUSTERPORTS is specified for the DVIPA being initialized (block 800). As described above, this may be accomplished by including the CLUSTERPORTS parameter in a VIPADISTRIBUTE statement. If CLUSTERPORTS is not specified for the DVIPA (block 800), then operations according to embodiments of the present invention may terminate. If CLUSTERPORTS is specified (block 800), it is determined if a structure which tracks cluster-wide port assignments for the DVIPA has been created in the coupling facility 40 for the DVIPA or DVIPAs (block 850). If not, the cluster-wide port assignments structure is created in the coupling facility 40 (block 855) and a stack specific port assignment structure is also created in the coupling facility 40 (block 865). As described above, the structure will keep track of the availability of ports for the DVIPA. In particular, the cluster-wide structure may take the form of a bitmap for each DVIPA with each bit corresponding to a port such that, for example, a "1" in the bit location indicates a port is available and a "0" indicates that a port is unavailable. The stack specific structure may take the form of a bitmap for each stack with each bit corresponding to a port such that, for example, a "1" in the bit location indicates a port is in use and a "0" indicates that a port is available. Both structures may be initialized to indicate that all ports are available. Alternatively, the structured may take the form of an enumerated list of available ports within the cluster and an enumerate list of used ports for a stack.

Returning to block 850, if the cluster-wide structure has previously been created, it is determined if the stack specific structure has been created (block 860). If not, the stack specific structure is created in the coupling facility 40 and initialized to indicate that all ports are available (block 865).

It is also determined if the CLUSTERPORTS parameter is part of a VIPARange statement (block 870). If not, operations continue with block 875 as described below. If the CLUSTERPORTS is part of a VIPARange statement (block 870), all active DVIPAs are determined and marked for termination processing (block 880). The connection table is scanned for ports of active DVIPAs (block 880) and the coupling facility 40 is updated with the DVIPA port information for both the cluster-wide structure and the stack specific structure (block 890).

If the CLUSTERPORTS parameter is added via a VARY OBEY (block 875), the connection table of the communication protocol stack is scanned for ports of active DVIPAs (block 885) and the coupling facility is updated with the port information for connections identified in block 885 (block 890) as described above. In particular embodiments of the present invention, the CLUSTERPORTS parameter may only be added by a VARY OBEY command if there are no active connections for a distributed VIPA. Thus, there should be no conflicts between ports of active connections. However, in other embodiments of the present invention, conflicts between connections with the same port may be resolved by showing the port as unavailable in the cluster-wide structure and in use in each of the stack specific structures until all connections utilizing the port have terminated. At that time the port could be marked as available. For example, a count of connections which use a port could be maintained and the structures indicate use of the port until the count was decremented to zero by the termination of connections using the port.

Figure 9:
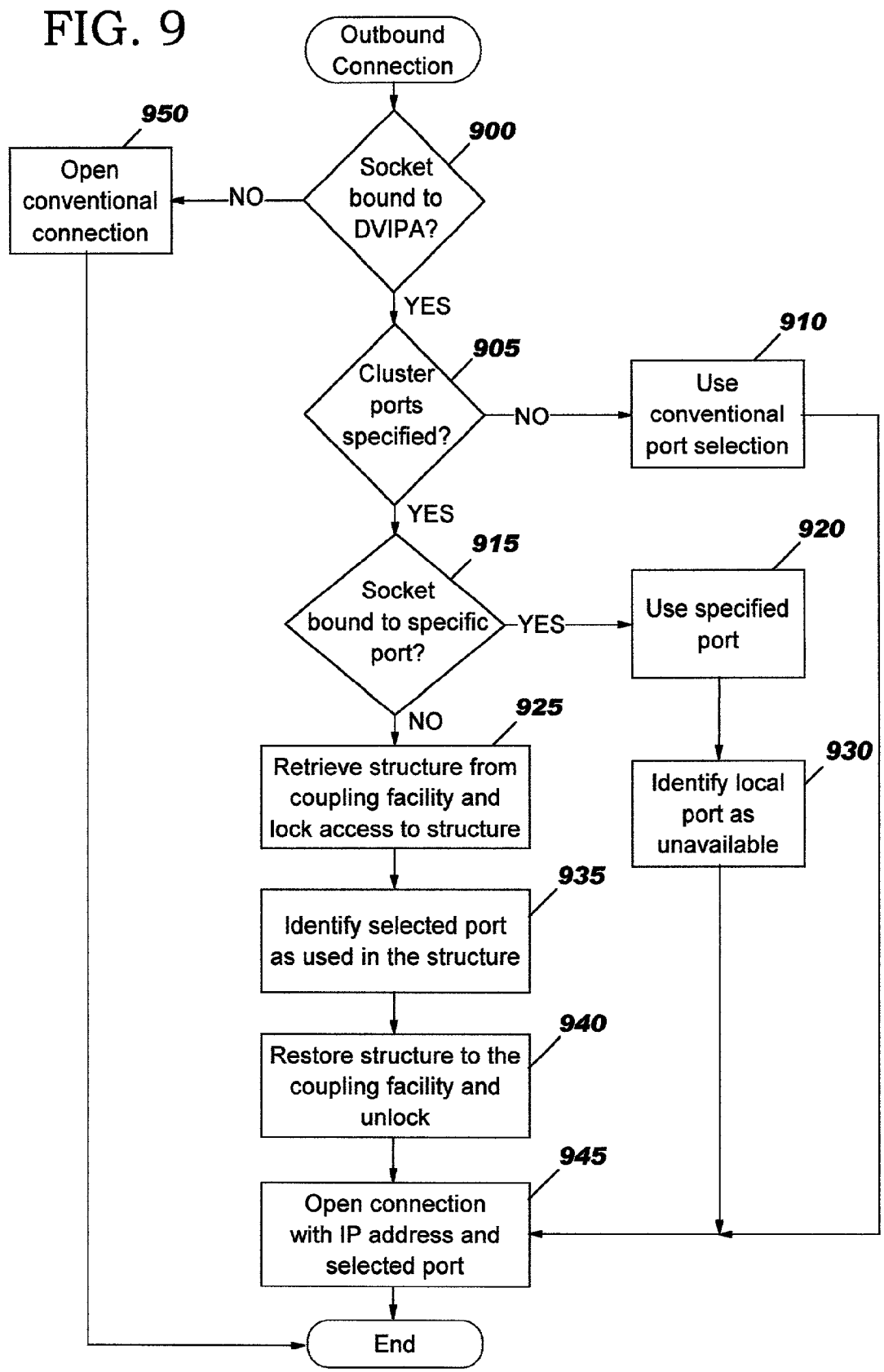
FIG. 9 is a flowchart illustrating operations for cluster-wide port assignment for DVIPAs according to embodiments of the present invention.

Operations for port assignment when an application initiates an outbound connection are illustrated in FIG. 9. At block 900, it is determined if the socket of the connection request is bound to a DVIPA. If not, conventional connection operations may be utilized (block 950). If the socket is bound to a DVIPA (block 900), it is determined if CLUSTERPORTS is specified for the DVIPA (block 905). If not, conventional port selection techniques may be utilized (block 910). If CLUSTERPORTS is specified for the DVIPA (block 905), it is determined if the socket is bound to a specific port or if an ephemeral port, such as ports greater than 1024, is to be selected (block 915). For example, binding the socket to port 0 may indicate that an ephemeral port is to be selected when a connection request is made. If the socket is bound to a specific port other than port 0, the specified port is selected for use (block 920) and may be identified locally as unavailable for use in another connection (block 930). The selected port is used to open the connection (block 945).

If the socket is not bound to a specific port and an ephemeral port is to be used (block 915), the structure or structures for the DVIPA are retrieved from the coupling facility 40 and a lock placed on the structure(s) to prevent other communications protocol stacks from accessing the structure (block 925). This may prevent two stacks from simultaneously selecting the same port. An available port is selected for the connection and is identified as used or unavailable in the structure of the embodiments of FIG. 8A and, in the embodiments of FIG. 8B, the port is identified as unavailable in the cluster-wide structure and in use in the stack specific structure (block 935). The updated structure or structures are restored to the coupling facility 40 and the structure(s) unlocked to allow access to the structure by other communication protocol stacks (block 940). The selected port is then used to open a connection using the DVIPA (block 945).

Figure 10:
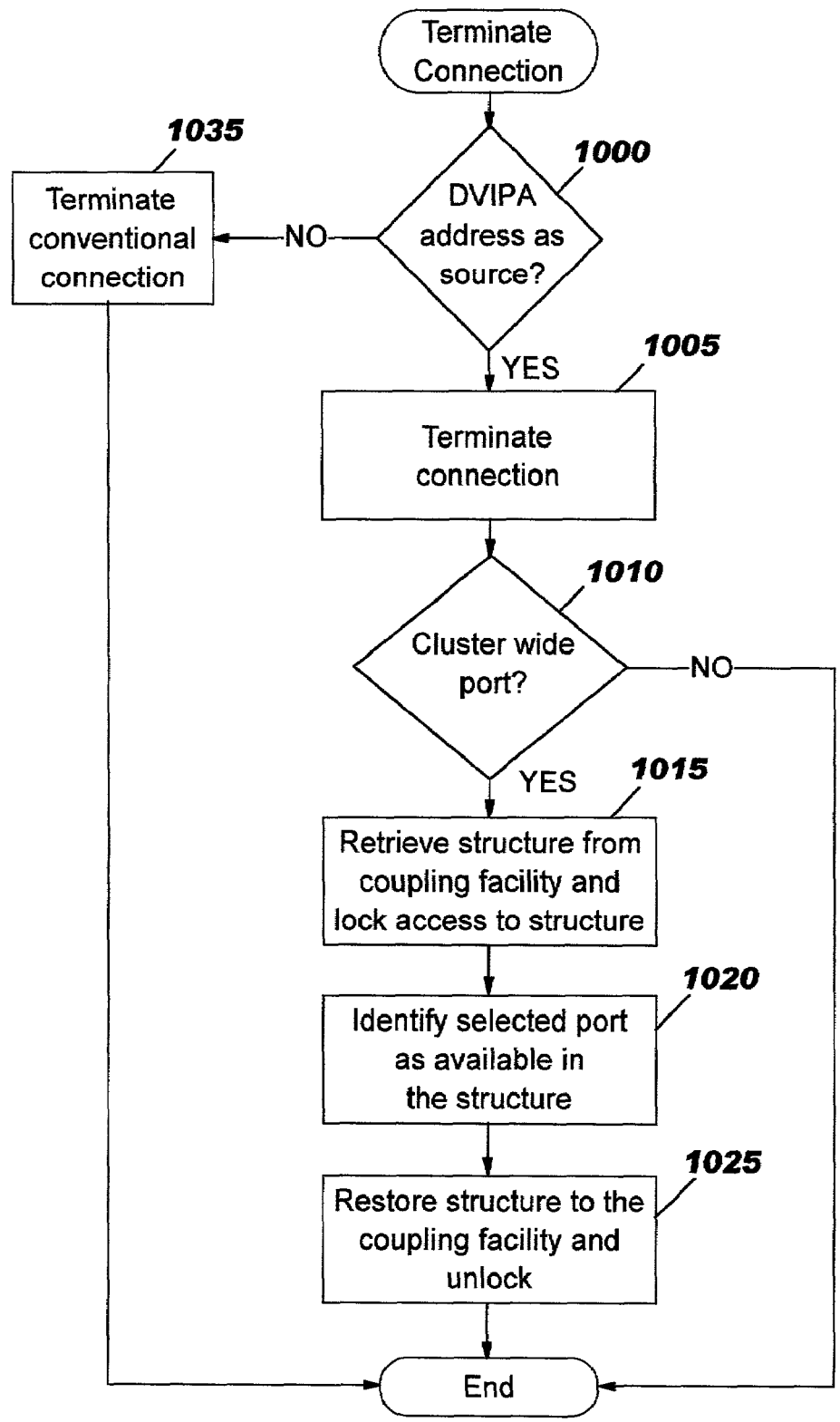
FIG. 10 is a flowchart illustrating operations for termination of a connection utilizing cluster-wide port assignment according to embodiments of the present invention.

FIG. 10 illustrates operations according to embodiments of the present invention when a connection is terminated. As seen in FIG. 10, it is determined if a DVIPA is specified as the source address for the connection (block 1000). If not, conventional termination operations may be utilized (block 1035). If the connection has a DVIPA as its source address (block 1005), the connection is terminated and appropriate tables are updated as would be the case with a conventional DVIPA (block 1005). It is also, however, determined if CLUSTERPORTS is specified for the DVIPA (block 1010). If not, no additional operation need be performed. If CLUSTERPORTS is specified (block 1010), the structure or structures are retrieved from the coupling facility 40 and access to the structure(s) is locked (block 1015). The structure in the embodiments of FIG. 8A is updated to identify the port of the connection which is terminating as available and, in the embodiments of FIG. 8B, the port is identified as available in the cluster-wide structure and not in use in the stack specific structure (block 1020). The structure or structures are restored to the coupling facility 40 and unlocked to allow other communications protocol stacks access to the structure(s) (block 1025).

Figure 11:
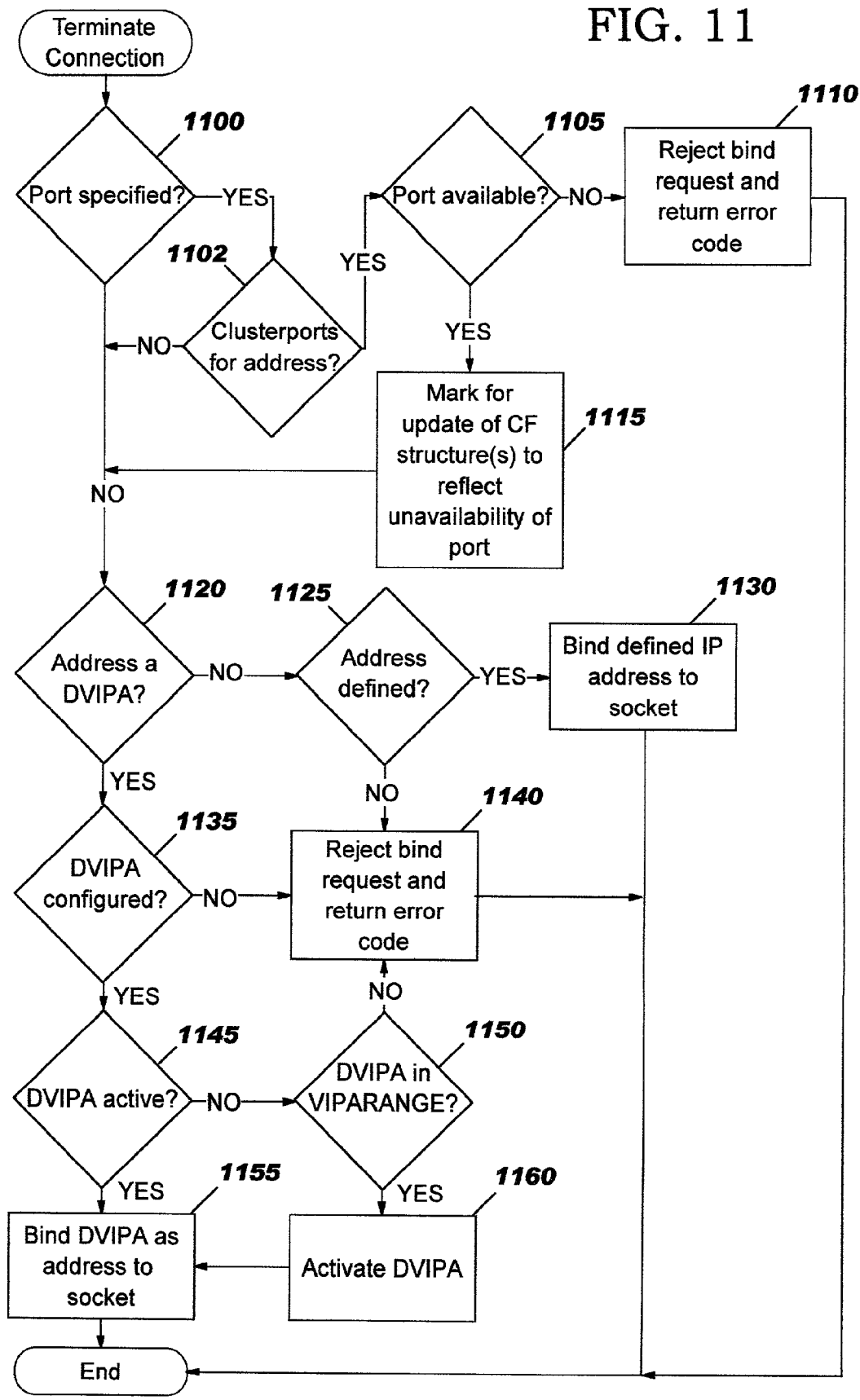
FIG. 11 is a flowchart illustrating operations according to embodiments of the present invention when a bind operation is requested by an application.

FIG. 11 illustrates operations according to embodiments of the present invention when a communication protocol stack receives a bind request from an application. As seen in FIG. 11, the communication protocol stack may determine if the bind request specifies a port (block 1100). If so, it may be determined if CLUSTERPORTS is defined for the address to which the bind request is directed (block 1102). If CLUSTERPORTS is specified (block 1102), the structure in the coupling facility 40 is checked to determine if the specified port is available (block 1105). If the port is not available (block 1105), the bind request is rejected and an error code is returned to the requesting application (block 1110). If the port is available (block 1105), bind request may be marked to update the coupling facility 40 to reflect that the port is in use if the bind operation is successful and, in embodiments having stack specific structures in the coupling facility 40, the stack specific structure would also updated (block 1115).

If the bind request is not rejected due to specification of an unavailable port (blocks 1100, 1102 and 1105), then it is determined if the address is a DVIPA (block 1120). If the specified address in the bind request is not a DVIPA (block 1120), it is determined if the specified address has previously been defined for the communication protocol stack receiving the request (block 1125). If not, an error code may be returned in response to the bind request (block 1140) and operations terminate. If the specified address has previously been defined for the communication protocol stack receiving the request (block 1125), the bind operation is completed using the specified address and, if the request is marked for update of the coupling facility 40 (see block 1115), the coupling facility is updated to reflect that the port specified in the bind request is not available (block 1130).

Returning to block 1120, if the specified address in the bind request is a DVIPA, it is determined if the DVIPA has been configured on the communication protocol stack receiving the request (block 1135). If not, an error code may be returned in response to the connection request (block 1140) and operations may be terminated. If the DVIPA is configured (block 1135), it is determined if the DVIPA is active on the communication protocol stack receiving the request (block 1145). If the DVIPA is active, the DVIPA is used as the source address for the connection (block 1155). If not, it is determined if the DVIPA is within a range of a VIPARANGE statement for the communication protocol stack (block 1150). If not, an error code may be returned (block 1140) and operations may be terminated. If the DVIPA is within a range of a VIPARANGE statement for the communication protocol stack (block 1150), the DVIPA is activated (block 1160) and the bind operation is completed using the DVIPA as the source address and, if the request is marked for update of the coupling facility 40 (see block 1115), the coupling facility is updated to reflect that the port specified in the bind request is not available (block 755).

As described above with respect to FIG. 7, while operations for performing a bind operation are illustrated in FIG. 11 in a particular order, other sequences of operations could also be utilized. For example, block 1120 could check for an active DVIPA and, if active, operations could continue at block 1155 with completion of the bind operation using the active DVIPA. If the address was not an active DVIPA the operations at block 1125 and after could be modified to be determined if the address was defined as a static VIPA or if it was defined in a VIPARANGE statement. If the address was a static VIPA it would be used to complete the bind operation. If the address was defined by a VIPARANGE statement the DVIPA would be activated. Thus, embodiments of the present invention should not be construed as limited to the particular sequence of operations illustrated in FIG. 11.

Figure 12:
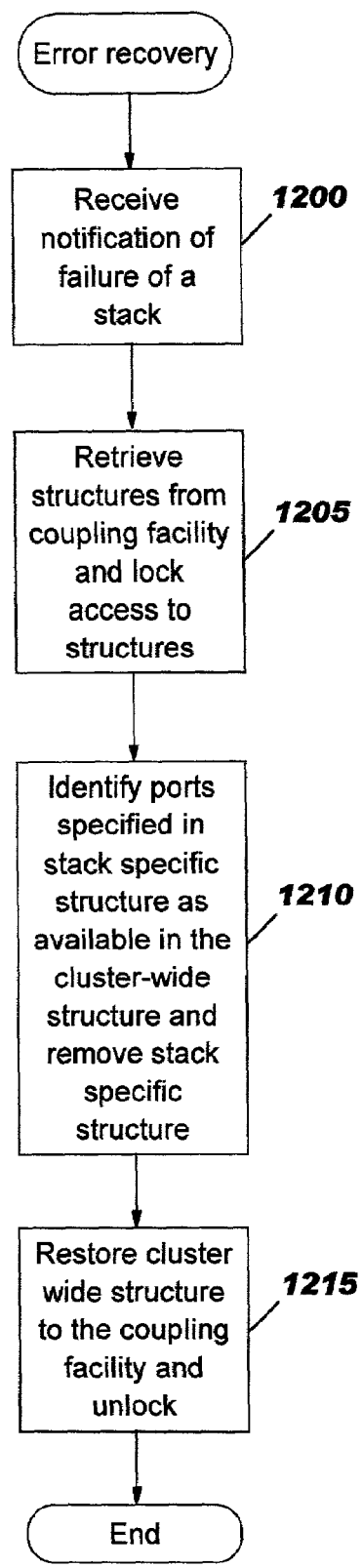
FIG. 12 is a flowchart illustrating operations according to embodiments of the present invention for recovery from failure of a communication protocol stack utilizing cluster-wide port assignment.

FIG. 12 illustrated operations for recovery from the failure of a communication protocol stack. Preferably, the operations of FIG. 12 are carried out by a routing communication protocol stack or a backup routing communication protocol stack if the failing communication protocol stack is a routing communication protocol stack. As seen in FIG. 12, the communication protocol stacks are notified of the failure of other communication protocol stacks in the cluster (block 1200), for example, by XCF messages. Upon notification of the failure of the communication protocol stack, the cluster-wide structure and the stack specific structure for the failing communication protocol stack are obtained from the coupling facility and locked to deny other communication protocol stacks access to the structures (block 1205). The ports identified in the stack specific structure as in use are then identified as available in the cluster-wide structure and the stack specific structure is deleted (block 1210).

In embodiments of the present invention where the cluster-wide structure and stack specific structure are bitmaps with a "1" in the cluster-wide structure indicating a port is available and a "1" in the stack specific structure indicating that a port is in use, the two bitmaps may be logically ORed together to update the cluster-wide structure. In embodiments with opposite polarity logic, the bitmaps may be logically ANDed together. In embodiments where the cluster-wide structure is an enumerated list of the available ports and the stack specific structure which is an enumerated list of the ports in use, the stack specific structure could be appended to the cluster-wide structure.

In any event, the cluster-wide structure is restored to the coupling facility 40 and unlocked so as to allow other communication protocol stacks access to the structure (block 1215). The stack specific structure need not be restored to the coupling facility 40 and, in fact, should be removed from the coupling facility 40, as the connections to the failing stack are no longer valid. If the connections are restarted on another communication protocol stack, the structures will be updated at that time.

In the Sysplex embodiments described above, the number of simultaneously active outbound connections across the cluster for a particular DVIPA may be 65,536, minus the number of ports that are restricted or otherwise in use on the stack. Thus, up to approximately 63,000 active connections may be initiated by outbound connection requests from the total set of application instances using a particular DVIPA. However, in alternative embodiments of the present invention, the entire connection routing hash table for the DVIPA may be stored in the coupling facility 40 or other shared memory. A communication protocol stack would then allocate a possible ephemeral port, construct the resulting connection routing entry (consisting of source and destination IP addresses and ports for the connection), and search the connection routing hash table to see if such an entry already exists. If the entry does not exist, the entry is added to the connection routing hash table and the connection request is issued with that ephemeral port. The ephemeral port is not marked as in use as normal, however, so that the same ephemeral port may be used when connecting using the same source DVIPA, but to a different destination IP address and/or port. In such embodiments, the limitation on simultaneous active outbound connections from the set of applications using the same DVIPA as source IP address is approximately 63,000 for each destination IP address/port pair.

As described herein, embodiments of the present invention may automatically allow designation of source IP address at an application instance granularity, irrespective of (current or future) location of the application instance within a cluster, and may do so in a manner which may reduce the need for specific programming in the application and specific configuration of the server instance. Thus, embodiments of the present invention may allow an administrator to designate the source IP address to be used for any application instance for outbound connection requests, designate that different application instances should use different source IP addresses for their outbound connection requests, or specify that several application instances should use the same source IP address for outbound connection requests. When several application instances on different TCP/IP stacks within the cluster use the same source IP address for outbound connection requests, coordinated assignment of ports may also be provided.

Thus, embodiments of the present invention may allow a cluster multiple instances of a TCP/IP application making outbound connection requests to present appearance of a single application instance to partner applications and networks outside the cluster. This may be accomplished in a manner which may reduce the need for special application-level programming or customization while possibly reducing the risk of connection failure due to inappropriate assignment of the same source port number by two different stacks to two different connections to the same server instance outside the cluster.

Both source IP address selection and cluster-wide port assignment may be utilized in combination to deploy a server application with inbound and outbound connection request handling in multiple instances using the same IP address for the local address for all connections. However, as described above, source IP address selection and cluster-wide port assignment may be utilized separately. For example, if there is only one instance of an application using an IP address as the designated source IP address for outbound connection requests, cluster-wide port assignment may not be needed. Similarly, if a server application initiates connections back to a client that has connected to the server using the same source IP address on the server connection as the client specified as a destination address on the connection the client initiated, then cluster-wide port assignment may be utilized to support parallel connections to the same client from two different instances of the cluster server application. However, because the application specifies the appropriate source IP address on its own, source IP address selection by the stack may not be needed.

While the present invention has been described with respect to the VIPA distribution, the cluster-wide port assignment and the source address selection functions being a part of the communication protocol stack, as will be appreciated by those of skill in the art, such functions may be provided as function, objects or applications which are separate from the communication protocol stack and which may cooperate with the communication protocol stacks. Furthermore, the present invention has been described with reference to particular sequences of operations. However, as will be appreciated by those of skill in the art, other sequences may be utilized while still benefitting from the teachings of the present invention. Thus, while the present invention is described with respect to a particular division of functions or sequences of events, such divisions or sequences are merely illustrative of particular embodiments of the present invention and the present invention should not be construed as limited to such embodiments.

Furthermore, while the present invention has been described with reference to particular embodiments of the present invention in a System/390 environment, as will be appreciated by those of skill in the art, the present invention may be embodied in other environments and should not be construed as limited to System/390 but may be incorporated into other systems, such as a Unix or other environments, by associating applications or groups of applications with an address rather than a communications adapter. Thus, the present invention may be suitable for use in any collection of data processing systems which allow sufficient communication to all of the systems for the use of dynamic virtual addressing. Accordingly, specific references to System/390 systems or facilities, such as the "coupling facility," "ESCON," "Sysplex" or the like should not be construed as limiting the present invention.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of assigning a port for a connection originated by one of multiple application instances, the multiple application instances executing on different data processing systems and utilizing a common network address, comprising:

providing an indication of available ports for the common network address to each of the different data processing systems executing the multiple application instances; and selecting a port identified as available as the port for the connection utilizing the common network address, wherein providing an indication of available ports comprises maintaining an identification of available ports associated with the common network address in a storage accessible by each of the multiple data processing systems; and wherein selecting a port comprises selecting a port identified as available in the storage accessible by each of the data processing systems.

2. The method of claim 1, wherein the step of selecting a port identified as available is responsive to the one of the multiple applications requesting to establish a connection utilizing the common network address as a source address for the connection.

3. The method of claim 1, wherein the common network address is a virtual Internet Protocol address.

4. The method of claim 1, wherein the identification of available ports comprises an identification of ports associated with existing connections utilizing the common network address such that ports which are not identified as associated with existing connections are identified as available.

5. The method of claim 1, further comprising establishing the connection utilizing the selected port and the common network address as a source network address and port of the connection.

6. The method of claim 5, wherein establishing the connection further comprises identifying the selected port as unavailable in the storage accessible by each of the data processing systems.

7. The method of claim 6, further comprising:

terminating the connection utilizing the selected port and the common network address; and identifying the selected port as available in the storage accessible by each of the data processing systems.

8. The method of claim 1, wherein the different data processing systems comprise a Sysplex and the storage accessible by each of the data processing systems comprises a coupling facility.

9. The method of claim 8, wherein the steps of maintaining an identification of available ports associated with the common network address in a storage accessible by each of the data processing systems and selecting a port identified as available in the storage accessible by each of the data processing systems are carried out by communication protocol stacks of the data processing systems.

10. The method of claim 9, wherein the step of maintaining an identification of available ports associated with the common network address further comprises:

maintaining a first structure in the coupling facility which indicates whether the port is available for assignment by any of the communication protocol stacks; and maintaining a second structure in the coupling facility for each of the communication protocol stacks which indicates which ports are in use by the corresponding communication protocol stack.

11. A method of assigning a port for a connection originated by one of multiple application instances, the multiple application instances executing on different data processing systems and utilizing a common network address, comprising:

providing an indication of available ports for the common network address to each of the different data processing systems executing the multiple application instances; and selecting a port identified as available as the port for the connection utilizing the common network address;

wherein providing an indication of available ports comprises maintaining an identification of available ports associated with the common network address in a storage accessible by each of the multiple data processing systems;

wherein selecting a port comprises selecting a port identified as available in the storage accessible by each of the data processing systems;
wherein the different data processing systems comprise a Sysplex and the storage accessible by each of the data processing systems comprises a coupling facility;
wherein the steps of maintaining an identification of available ports associated with the common network address in a storage accessible by each of the data processing systems and selecting a port identified as available in the storage accessible by each of the data processing systems are carried out by communication protocol stacks of the data processing systems; and
wherein the step of maintaining an identification of available ports associated with the common network address further comprises:
maintaining a first structure in the coupling facility which indicates whether the port is available for assignment by any of the communication protocol stacks; and
maintaining a second structure in the coupling facility for each of the communication protocol stacks which indicates which ports are in use by the corresponding communication protocol stack;
detecting a failure of one of the communication protocol stacks; and
revising the first structure based on the second structure corresponding to the failed communication protocol stack so as to indicate that the ports in used by the failed communication protocol stack are available for use.

12. A method of coordinating port assignments for connections utilizing a dynamic virtual Internet Protocol address (DVIPA) as a source address, wherein the DVIPA is utilized as a source address for connections originated by a plurality of data processing systems, comprising:
maintaining an indication of available ports associated with the DVIPA in a storage facility which is commonly accessible to communication protocol stacks of the plurality of data processing systems; and
selecting a port for a connection utilizing the DVIPA as a source address based on the indication of available ports associated with the DVIPA in the storage facility, wherein maintaining an indication of available ports and selecting a port are carried out by the communication protocol stacks of the plurality of data processing systems and wherein maintaining an indication of available ports and selecting a port are selectively carried out by the communication protocol stacks responsive to a predefined keyword being provided in a configuration statement which defines the DVIPA to the communication protocol stack.

13. The method of claim 12, wherein maintaining an indication of available ports associated with the DVIPA comprises maintaining a structure in a coupling facility of a Sysplex, the structure indicating whether a port is in use by a connection utilizing the DVIPA as a source address.

14. The method of claim 13, wherein selecting a port comprises:
accessing the coupling facility to obtain the structure; and
evaluating the structure to select a port which is not in use by a connection.

15. The method of claim 14, further comprising updating the structure in the coupling facility to reflect that the selected port is in use by a connection utilizing the DVIPA as a source address.

16. The method of claim 14, wherein accessing the coupling facility and updating the coupling facility comprise:

obtaining the structure from the coupling facility;
locking the structure in the coupling facility to prevent access to the structure by other communication protocol stacks; then
revising the structure to reflect that the selected port is in use;
returning the structure to the coupling facility; and then
unlocking the structure in the coupling facility to allow access to the structure by other communication protocol stacks.

17. The method of claim 16, wherein the structure comprises a bitmap and wherein revising the structure comprises setting a bit of the bitmap to a predefined value to indicate that a port corresponding to the bit is in use.

18. The method of claim 16, wherein the structure comprises an enumerated list of available ports and wherein revising the structure comprises removing selected port from the enumerated list.

19. The method of claim 12, wherein the configuration statement is at least one of a VIPADEFine statement, a VIPADISTribute statement and a VIPARANGE statement.

20. The method of claim 12, further comprising updating the indication of available ports to reflect existing connections using the DVIPA if the predefined keyword is added to a configuration statement after initialization of a routing communication protocol stack.

21. The method of claim 13, wherein maintaining a structure in a coupling facility further comprises updating the structure in the coupling facility to reflect that a port of a connection utilizing the DVIPA as a source address is not in use when the connection utilizing the DVIPA as a source address terminates.

22. A method of coordinating port assignments for connections utilizing a dynamic virtual Internet Protocol address (DVIPA) as a source address, wherein the DVIPA is utilized as a source address for connections originated by a plurality of data processing systems, comprising:
maintaining an indication of available ports associated with the DVIPA in a storage facility which is commonly accessible to communication protocol stacks of the plurality of data processing systems; and
selecting a port for a connection utilizing the DVIPA as a source address based on the indication of available ports associated with the DVIPA in the storage facility;
wherein maintaining an indication of available ports and selecting a port are carried out by the communication protocol stacks of the plurality of data processing systems;
wherein maintaining an indication of available ports associated with the DVIPA comprises maintaining a structure in a coupling facility of a Sysplex, the structure indicating whether a port is in use by a connection utilizing the DVIPA as a source address;
wherein maintaining a structure in a coupling facility further comprises updating the structure in the coupling facility to reflect that a port of a connection utilizing the DVIPA as a source address is not in use when the connection utilizing the DVIPA as a source address terminates; and
wherein updating the structure in the coupling facility comprises:
obtaining the structure from the coupling facility;
locking the structure in the coupling facility to prevent access to the structure by other communication protocol stacks; then
revising the structure to reflect that the port associated with the terminated connection is not in use;

returning the structure to the coupling facility; and then
unlocking the structure in the coupling facility to allow access to the structure by other communication protocol stacks.

23. The method of claim 22, wherein the structure comprises a bitmap and wherein revising the structure comprises setting a bit of the bitmap to a predefined value to indicate that a port corresponding to the bit is not in use.

24. he method of claim 22, wherein the structure comprises an enumerated list of available ports and wherein revising the structure comprises adding the port associated with the terminated connection to the enumerated list.

25. The method of claim 12, wherein maintaining an indication of available ports associated with the DVIPA comprises maintaining a copy of a connection routing hash table associated with the DVIPA in a coupling facility of a Sysplex, the connection routing hash table indicating source address and source port and destination address and destination port for connections utilizing the DVIPA.

26. The method of claim 25, wherein selecting a port comprises:
determining a connection routing hash table entry for a source address and source port and a destination address and destination port of a connection utilizing the DVIPA as a source address;
evaluating the connection routing hash table in the coupling facility to determine if an entry exists corresponding to the determined connection routing hash table entry; and
selecting the port utilized in determining the connection routing hash table entry if a corresponding entry does not exist.

27. The method of claim 25, further comprising updating the connection routing hash table in the coupling facility to incorporate the determined connection routing hash table entry.

28. A method of coordinating port assignments for connections utilizing a dynamic virtual Internet Protocol address (DVIPA) as a source address, wherein the DVIPA is utilized as a source address for connections originated by a plurality of data processing systems, comprising:
maintaining an indication of available ports associated with the DVIPA in a storage facility which is commonly accessible to communication protocol stacks of the plurality of data processing systems; and
selecting a port for a connection utilizing the DVIPA as a source address based on the indication of available ports associated with the DVIPA in the storage facility;
wherein maintaining an indication of available ports and selecting a port are carried out by the communication protocol stacks of the plurality of data processing systems;
wherein maintaining an indication of available ports associated with the DVIPA comprises maintaining a copy of a connection routing hash table associated with the DVIPA in a coupling facility of a Sysplex, the connection routing hash table indicating source address and source port and destination address and destination port for connections utilizing the DVIPA, the method further comprising updating the connection routing hash table in the coupling facility to incorporate the determined connection routing hash table entry; and
wherein evaluating the connection routing hash table and updating the connection routing hash table comprise:
obtaining the connection routing hash table from the coupling facility;
locking the structure in the coupling facility to prevent access to the connection routing hash table by other communication protocol stacks; then
incorporating the determined connection routing hash table entry into the connection routing hash table;
returning the connection routing hash table to the coupling facility; and then
unlocking the connection routing hash table in the coupling facility to allow access to the connection routing hash table by other communication protocol stacks.

29. The method of claim 25, wherein maintaining a copy of a connection routing hash table in a coupling facility further comprises updating the connection routing hash table in the coupling facility to reflect that a connection utilizing the DVIPA as a source address is not in use when the connection utilizing the DVIPA as a source address terminates.

30. A method of coordinating port assignments for connections utilizing a dynamic virtual Internet Protocol address (DVIPA) as a source address, wherein the DVIPA is utilized as a source address for connections originated by a plurality of data processing systems, comprising:
maintaining an indication of available ports associated with the DVIPA in a storage facility which is commonly accessible to communication protocol stacks of the plurality of data processing systems; and
selecting a port for a connection utilizing the DVIPA as a source address based on the indication of available ports associated with the DVIPA in the storage facility;
wherein maintaining an indication of available ports and selecting a port are carried out by the communication protocol stacks of the plurality of data processing systems;
wherein maintaining an indication of available ports associated with the DVIPA comprises maintaining a copy of a connection routing hash table associated with the DVIPA in a coupling facility of a Sysplex, the connection routing hash table indicating source address and source port and destination address and destination port for connections utilizing the DVIPA;
wherein maintaining a copy of a connection routing hash table in a coupling facility further comprises updating the connection routing hash table in the coupling facility to reflect that a connection utilizing the DVIPA as a source address is not in use when the connection utilizing the DVIPA as a source address terminates; and
wherein updating the connection routing hash table in the coupling facility comprises:
obtaining the connection routing hash table from the coupling facility;
locking the connection routing hash table in the coupling facility to prevent access to the connection routing hash table by other communication protocol stacks; then
revising the connection routing hash table to remove an entry corresponding to the terminated connection;
returning the connection routing hash table to the coupling facility; and then
unlocking the connection routing hash table in the coupling facility to allow access to the connection routing hash table by other communication protocol stacks.

31. The method of claim 12, wherein the step of maintaining an indication of available ports further comprises:
maintaining a first structure in the storage facility which indicates whether the port is available for assignment by any of the communication protocol stacks; and
maintaining a second structure in the storage facility for each of the communication protocol stacks which indicates which ports are in use by the corresponding communication protocol stack.

32. A method of coordinating port assignments for connections utilizing a dynamic virtual Internet Protocol address (DVIPA) as a source address, wherein the DVIPA is utilized as a source address for connections originated by a plurality of data processing systems, comprising:

maintaining an indication of available ports associated with the DVIPA in a storage facility which is commonly accessible to communication protocol stacks of the plurality of data processing systems; and selecting a port for a connection utilizing the DVIPA as a source address based on the indication of available ports associated with the DVIPA in the storage facility;

wherein the step of maintaining an indication of available ports further comprises:

maintaining a first structure in the storage facility which indicates whether the port is available for assignment by any of the communication protocol stacks; and maintaining a second structure in the storage facility for each of the communication protocol stacks which indicates which ports are in use by the corresponding communication protocol stack;

detecting a failure of one of the communication protocol stacks; and revising the first structure based on the second structure corresponding to the failed communication protocol stack so as to indicate that the ports in used by the failed communication protocol stack are available for use.

* * * * *